United States Patent
Nwoga et al.

(10) Patent No.: US 10,186,711 B2
(45) Date of Patent: Jan. 22, 2019

(54) PHOTOCATALYTIC METHODS FOR PREPARATION OF ELECTROCATALYST MATERIALS

(71) Applicants: Toyota Motor Engineering & Manufacturing North America, Inc., Erlanger, KY (US); Toyota Motor Corporation, Toyota, Aichi (JP); Sandia Corporation, Albuquerque, NM (US)

(72) Inventors: Tochi Tudor Nwoga, Ann Arbor, MI (US); Kazuo Kawahara, Nagoya (JP); Wen Li, Ypsilanti, MI (US); Yujiang Song, Liaoning (CN); John A. Shelnutt, Tijeras, NM (US); James E. Miller, Albuquerque, NM (US); Craig John Medforth, Porto (PT); Yukiyoshi Ueno, Aichi (JP); Tetsuo Kawamura, Aichi (JP)

(73) Assignees: Toyota Motor Engineering & Manufacturing North America, Inc., Plano, TX (US); Toyota Motor Corporation, Toyota (JP); Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/086,694

(22) Filed: Nov. 21, 2013

(65) Prior Publication Data

US 2014/0080038 A1 Mar. 20, 2014

Related U.S. Application Data

(60) Division of application No. 12/166,957, filed on Jul. 2, 2008, now Pat. No. 8,609,573, which is a
(Continued)

(51) Int. Cl.
*H01M 4/90* (2006.01)
*B01J 23/42* (2006.01)
(Continued)

(52) U.S. Cl.
CPC .......... *H01M 4/9083* (2013.01); *B01J 23/42* (2013.01); *B82Y 30/00* (2013.01); *H01M 4/8605* (2013.01);
(Continued)

(58) Field of Classification Search
None
See application file for complete search history.

(56) References Cited

U.S. PATENT DOCUMENTS

| | | |
|---|---|---|
| 5,069,988 A | 12/1991 | Tomantschger et al. |
| 5,312,896 A | 5/1994 | Bhardwaj et al. |

(Continued)

FOREIGN PATENT DOCUMENTS

| | | | | |
|---|---|---|---|---|
| CN | 1171671 C | * | 10/2004 | ............... B01J 23/40 |
| EP | 0994520 | | 4/2000 | |

(Continued)

OTHER PUBLICATIONS

CN 1171671 C, an English translation.*
(Continued)

*Primary Examiner* — Yun Qian
(74) *Attorney, Agent, or Firm* — Dinsmore & Shohl LLP

(57) ABSTRACT

The invention relates to methods of preparing metal particles on a support material, including platinum-containing nanoparticles on a carbon support. Such materials can be used as electrocatalysts, for example as improved electrocatalysts in proton exchange membrane fuel cells (PEM-FCs).

1 Claim, 16 Drawing Sheets

Related U.S. Application Data continuation-in-part of application No. 11/329,853, filed on Jan. 11, 2006, now Pat. No. 8,541,146.

(60) Provisional application No. 60/643,283, filed on Jan. 12, 2005.

(51) Int. Cl.
| | | |
|---|---|---|
| *B82Y 30/00* | (2011.01) | |
| *H01M 4/86* | (2006.01) | |
| *H01M 4/92* | (2006.01) | |
| *H01M 8/1018* | (2016.01) | |

(52) U.S. Cl.
CPC ............. *H01M 4/92* (2013.01); *H01M 4/926* (2013.01); *H01M 4/921* (2013.01); *H01M 2008/1095* (2013.01)

(56) References Cited

U.S. PATENT DOCUMENTS

| | | | |
|---|---|---|---|
| 5,372,981 | A | 12/1994 | Witherspoon |
| 5,409,671 | A | 4/1995 | Takemoto et al. |
| 6,107,241 | A | 8/2000 | Ogata et al. |
| 6,165,635 | A | 12/2000 | Auer et al. |
| 6,245,707 | B1 | 6/2001 | Chu et al. |
| 6,518,217 | B2 | 2/2003 | Xing et al. |
| 2002/0132154 | A1 | 9/2002 | Adzic et al. |
| 2003/0091889 | A1 | 5/2003 | Sotomura et al. |
| 2004/0224206 | A1 | 11/2004 | Matsumoto et al. |
| 2004/0236157 | A1 | 11/2004 | Heilgendorff et al. |
| 2004/0259725 | A1* | 12/2004 | Chondroudis et al. ....... 502/185 |
| 2005/0221975 | A1 | 10/2005 | Renock et al. |
| 2006/0034752 | A1 | 2/2006 | Lin et al. |
| 2006/0251953 | A1 | 11/2006 | Li et al. |
| 2007/0231674 | A1 | 10/2007 | Shelnutt et al. |
| 2009/0011928 | A1 | 1/2009 | Nwoga et al. |

FOREIGN PATENT DOCUMENTS

| | | |
|---|---|---|
| JP | 11111305 | 4/1999 |
| JP | 2001340761 | 12/2001 |
| JP | 2004-178855 A | 6/2004 |
| WO | PCT/US1988/002815 | 8/1988 |
| WO | 99/53557 | 10/1999 |
| WO | 2004/073096 | 8/2004 |
| WO | 2004095614 | 11/2004 |

OTHER PUBLICATIONS

Honji et al. J. Electrochem. Soc.: Electrochemical Science and Technology, 1988, 135(2), 355-359.*

Y.J. Song et al.; Controlled Synthesis of 2-D and 3-D Platinum Dendrites Using Porphyrin Photocatalysts Journal of the Am. Chem. Soc., 126(2), 635-645, 2004.

Lefevre et al., "O-2 Reduction in PEM Fuel Cells: Activiity and Active Site Structural Information for Catalysts Obtained by the Pyrolysis at HighTemperature of Fe Precursors" Journal of Phys. Chem, B104, 11238-11247, 2000.

Widelov, Pyrolsis of Iron and cobalt Porphyrine Sublimated onto line the Surface of Cabon Black as a Method to Prepare Catalysts for O2 Reduction. Electrochimica Acta, vol. 38, Issue 17, Dec. 1992; pp. 2493-2502.

Yin Geping et al.; Preparation and performance of anode catalysts Pt/ C for PEMFC; Journal of Harbin Institute of Technology; vol. 35, No. 10; Oct. 2003; pp. 1224-1227.

Guan et al., Applied Catalysis: Environmental 41 (2003) pp. 387-396.

Uchida et al. J. Electrochem. Soc., 1998, 145(11), 3708-3713.

* cited by examiner

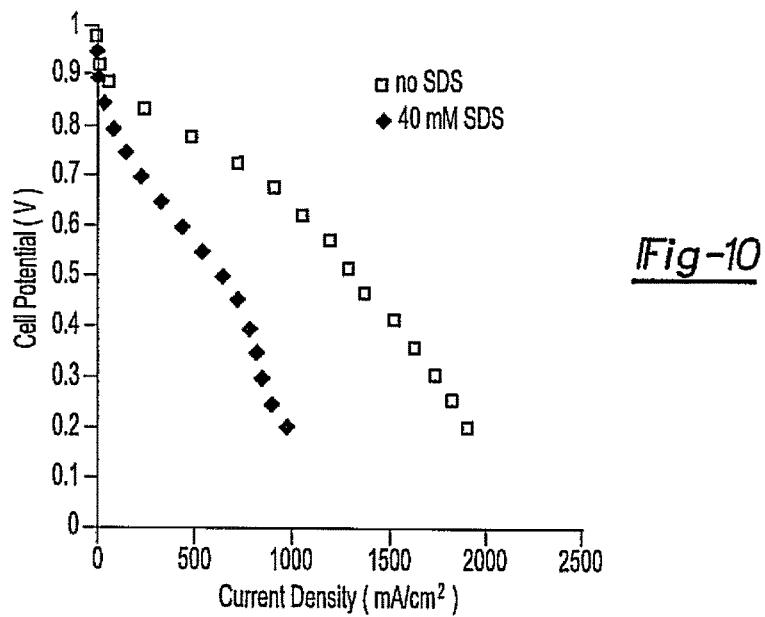
Fig-10
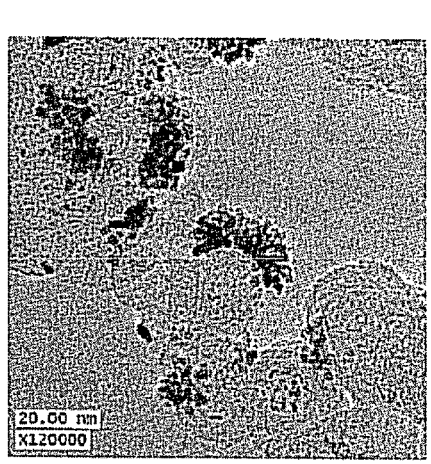
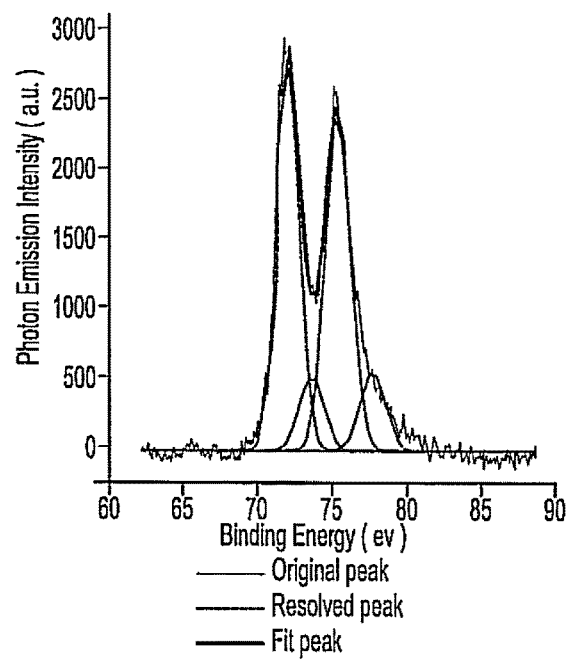
Fig-11A
Fig-11B

SnProtoP

SnUroP

SnTCPP

SnNMePyP

SnTPPS4

0 ml of Pt Seed Solution 1 ml of Pt Seed Solution 3 ml of Pt Seed Solution 5 ml of Pt Seed Solution 10 ml of Pt Seed

PHOTOCATALYTIC METHODS FOR PREPARATION OF ELECTROCATALYST MATERIALS

CROSS-REFERENCE TO RELATED APPLICATIONS

This application is a divisional of U.S. patent application Ser. No. 12/166,957, filed Jul. 2, 2008, which is a continuation-in-part of U.S. patent application Ser. No. 11/329,853 filed on Jan. 11, 2006 and claims priority to U.S. Provisional Patent Application Ser. No. 60/643,283 filed Jan. 12, 2005, the entire contents of which are incorporated herein by reference.

GOVERNMENT INTEREST

This invention was made with government support under CRADA No. SC04/01686 awarded by the U.S. Department of Energy. The government has certain rights in the invention.

FIELD OF THE INVENTION

The invention relates to catalysts, in particular to electrocatalysts comprising metal particles supported on an electrically conducting support material.

BACKGROUND OF THE INVENTION

Fuel cells have been extensively studied for numerous applications, including automotive applications. One of the key components of a fuel cell is the electrocatalyst, the nature of which will impact on both performance and cost of the fuel cell. A typical electrocatalyst is formed from platinum particles on a carbon support. The electrochemical reactions for a fuel cell occur on the surface of the platinum particles, and thus for a given amount of platinum, smaller particles are preferred in order to obtain higher utilization of the platinum as a catalyst. However, there is often an aggregation problem for smaller platinum particles on the carbon support when exposed to fuel cell conditions, the aggregation of the particles requiring additional platinum to ensure a given level of performance. In addition, the tremendous demand for platinum has greatly increased its cost, and thus reducing the amount of platinum used in a fuel cell would greatly aid commercialization of this technology.

In a typical proton exchange membrane (PEM) fuel cell (FC), the PEM is sandwiched between two electrodes, an anode and a cathode. The fuel cell includes a supply of fuel such as hydrogen gas to the anode, where the hydrogen is converted to hydrogen ions (protons) and electrons. Oxygen is supplied to the cathode, where the oxygen, hydrogen ions conducted through the PEM, and electrons conducted through an external circuit combine to form water. Electrocatalysts are used to facilitate these electrode reactions. For better fuel cell performance, the catalytically active material (platinum) should be in contact with an electron-conducting material such as carbon black that conducts the electrons, and a proton conductor (the PEM) that conducts the protons. However, in a conventional PEM fuel cell, if platinum is located in pores of the carbon black, contact with the PEM may be lost, reducing effectiveness.

SUMMARY OF THE INVENTION

The invention relates to methods of preparing metal particles on a support material, including platinum-containing nanoparticles on a carbon support. The invention also relates to electrocatalysts using such materials, including catalytically active metal particles on a support material, and other applications of such electrocatalysts. In particular examples, the invention relates to improved electrocatalysts for proton exchange membrane fuel cells (PEM-FCs).

In improved methods of electrocatalyst manufacture, a photocatalyst is used to seed formation of metal particles, such as platinum-containing nanoparticles, on the surface of a support material, such as carbon. As the photocatalyst can readily be well dispersed over the surface of the support material, the metal particles are also well dispersed, particularly when compared with prior art approaches. The presence of numerous, well dispersed photocatalyst sites on the support material also leads to uniform particle size distributions, again compared with conventional approaches. Further, any undesirable organic component of the photocatalyst can be converted into additional carbon support material by pyrolysis after formation of the metal particles.

Electrocatalysts according to the present invention include metal particles where one or more metal species are be present in the particles, including platinum, platinum alloys such as platinum-iron alloys, and the like. By using a mixture of metal precursor compounds, alloy particles can be formed on a support material, including platinum-iron alloy particles.

A method for making an electrocatalyst comprises providing a mixture including a photocatalyst, a reductant, and a metal compound, and illuminating the mixture so as to form metal particles by reduction of the metal compound. The metal particles are supported on a support material to form the electrocatalyst. The support material is electrically conducting, being a good electron conductor. An example support material is a carbon-containing material, such as carbon black. The photocatalyst may be an organometallic compound, such as a metal porphyrin, for example tin porphyrin or antimony porphyrin. The reductant may be, for example, ascorbic acid and hydroquinone. Illumination may include exposure to visible and/or UV light.

The mixture includes at least one metal compound, such as a platinum compounds, iron compound, or combination thereof. A mixture of metal compounds may be used to form alloy particles, including platinum alloy particles such as iron-platinum alloy particles. The metal particles may be nanoparticles, for example having a median diameter of less than 100 nm, such as between 1 and 10 nm.

The support material may be present in the illuminated mixture, or may be combined later. In one approach, the photocatalyst is dispersed on the support material surface, and then the photocatalyst-coated support material is combined with the reductant and the metal compound into the mixture. The photocatalyst may be dispersed over the surface of the support material by dissolving (or suspending) the photocatalyst and support material in a common solvent, then evaporating the solvent. Illumination may occur during and/or after combination. In another approach, the metal particles are formed during illumination of a mixture that does not include the support material, and the support material and metal particles are combined later. For example, a suspension of support material (such as a carbon suspension) may be combined with a suspension of metal particles. The suspension of metal particles may be the mixture after illumination, or additional filtering may be performed.

An improved method for making an electrocatalyst comprises forming metal particles on a support material having a surface photocatalyst dispersed on its surface by photoreduction of a metal compound. An additional pyrolysis step can be used to convert any organic components present (such as the photocatalyst) to additional carbon support material.

BRIEF DESCRIPTION OF THE DRAWINGS

FIG. 10 shows performance curves of SDS and non-SDS cells after a break-in period;

FIGS. 11A and 11B show a TEM image and a Pt 4f X-ray photoelectron spectrum (respectively) for Pt nanoparticles grown on carbon black;

FIGS. 12A-12C show a high-resolution TEM image, a scanning TEM image, and an interfacial electron density profile respectively for Pt nanoparticles grown on carbon black;

DETAILED DESCRIPTION OF THE PREFERRED EMBODIMENTS

Examples of the present invention include electrocatalysts having metal particles supported by an electrically conducting support material, and methods of fabricating such electrocatalysts.

Improved electrocatalysts can be fabricated using illumination of a mixture including one or more metal precursor compounds, a photocatalyst, and a reductant to produce metal particles through the reduction of the metal precursor compound. A photocatalyst, such as an organometallic photocatalyst, may be dispersed over the surface of a support material (or in another approach dispersed through a mixture not including the support material) and used to seed the formation of highly dispersed metal particles. In the case of electrocatalysts including platinum-containing particles on a carbon support, the present invention allows the utilization of platinum to be increased, reducing the amount of platinum needed in fuel cell applications. The formation of particles within the fine pores of a carbon support may also be prevented.

As the photocatalyst can be well dispersed over the surface of the support material, the resulting metal particles are also well dispersed. The metal particles also have more uniform and controlled sizes compared with previous approaches.

The metal particles may be substantially a single metal species, such as platinum particles, or contain a plurality of metal species, for example in the form of an alloy particle. The metal particles may be platinum-containing particles (such as substantially pure platinum, or platinum alloys such as platinum-iron alloys), or other species of catalytically active material. Particles may be nanoparticles, having a dimension less than 1 micron, and may be substantially spheroidal.

Example electrocatalysts according to the present invention include nano structured metal particles having a diameter of between approximately 1 nanometer and 10 nanometers, supported on a surface of a support material. Pyrolysis, for example under ammonia or other inert atmosphere, can be used to convert organic compounds into a part of the support material, for example as carbon formed by the pyrolysis. This may increase the thermal stability of the particles and prevent aggregation. For some applications, the pyrolysis step may not be necessary.

In conventional platinum-carbon electrocatalysts, a large number of platinum particles do not take part in the reactions of the electrode layers. This results in low platinum utilization. Additionally, the electrolyte cannot effectively penetrate into the fine pores of the carbon where many platinum particles are located. The catalyst is inactive if it is not in contact with the electrolyte. This wastage of platinum leads to a reduced proton formation under PEM fuel cell conditions, and is a reason for low platinum utilization.

Figure 1A:
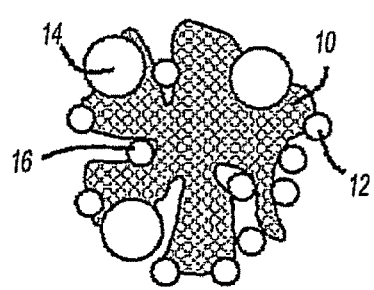
FIGS. 1A-1C illustrate schematically metal particles on a carbon particle, including a conventional electrocatalyst in which poor particle size control and poor dispersion over the surface reduce platinum (Pt) utilization (FIG. 1A), an electrocatalyst according to the present invention having highly dispersed metal particles over the surface of a carbon support (FIG. 1B), and a pyrolysis method (FIG. 1C)

FIG. 1A illustrates a conventional configuration, comprising a carbon support material 10 having platinum particles such as 12 dispersed over the surface of the carbon. The presence of large particles such as 14 is one cause of low platinum utilization, and another is the presence of particles such as 16 within narrow pores of the carbon support material, where the electrolyte would probably not contact in a PEM fuel cell. Without contact with the electrolyte, the catalyst is effectively inactive, reducing catalyst utilization.

Figure 1B:
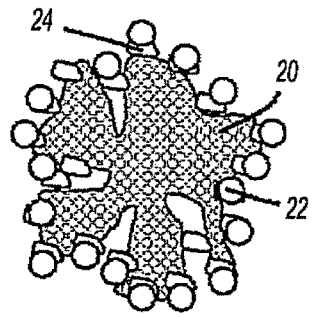

FIG. 1B is a schematic of an electrocatalyst formed using a method according to the present invention. The carbon particle 20 supports well dispersed platinum nanoparticles (or other metal or alloy particles) 22 over the surface of the carbon support material. The organometallic photocatalyst 24 (indicated as non-circular patches on the surface of the support material) may be pre-absorbed on the surface of the carbon support, and the photocatalyst then used to seed the formation of the metal particles from a mixture containing a metal precursor compound and reductant under illumination. Using methods according to the present invention, the metal particles are better dispersed over the surface of the support material, and have a more uniform size distribution.

Figure 1C:
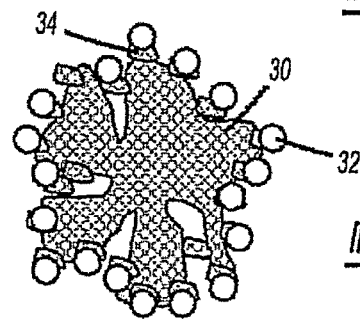

FIG. 1C illustrates how the organic precursor is converted to new carbon support material, for example at 34 on the surface of the carbon support 30, this having a metal cluster 32 supported thereon.

Photocatalysts

Photocatalysts which may be used include one or more porphyrins (such as metal porphyrins or free base porphyrin), or other organometallic materials. Preferably, the photocatalyst yields a long-lived excited triplet state on exposure to visible or UV light and gives a radical anion or cation by interaction with the reductant.

Platinum particles are formed in the presence of photocatalysts, such as tin-porphyrin, under illumination by UV or visible light by reduction of platinum precursor compounds.

Photocatalytic methods of platinum nanostructure formation are described in detail in Y. J. Song, Y. Yang, C. Medforth, E. Pereira, A. K. Singh, H. Xu, Y. Jiang, C. J. Brinker, F. van Swol, J. A. Shelnutt, "Controlled Synthesis of 2-D and 3-D Platinum Particles Using Porphyrin Photocatalysts", Journal of the American Chemical Society, 126 (2), 635-645, 2004. Further details are described in U.S. Pat. No. 6,627,048 to Shelnutt et al. and U.S. Pat. No. 4,568,435 to Shelnutt. As described therein, tin porphyrin and antimony porphyrin were used to reduce metal ions to metals through a photoinduced reaction. Metal precursors included metal nitrates and metal chlorides, metal compounds including compounds of uranium, mercury, copper, lead, gold, silver, or platinum. Reductants included ethylenediaminetetraacetic acid, triethylamine, triethanolamine, and sodium nitrite. Examples described therein may be used in embodiments of the present invention.

The photocatalyst-based method gives well controlled size and uniformity to the formed platinum particles.

The photocatalyst can act as an initiator for the growth of small metal particles, providing a precise method for producing a large initial concentration of seeds. This leads to well-controlled size and uniformity of the metal particles, such as platinum particles. In some embodiments of the present invention, the photocatalyst may be dispersed over an electrically conducting support material, and used to photocatalyze formation of metal particles onto the support material.

Illumination

The illumination step may include exposure to visible and/or UV light, or other radiation. The illuminated mixture may be agitated for even illumination of mixture components. Optical components, such as fibers, may be used to introduce illumination into the bulk of a mixture. The mixture may further include phosphors or other light-emitting elements, with light emission stimulated by an external energy source.

Reductants

Reductants which may be used include hydroquinone, ascorbic acid (including all salts such as sodium ascorbate), and other reductants known in the art.

Metal Precursors

Metal precursors are the metal compounds that are photocatalytically reduced, and may include one or more of the following metal atoms: Pt, Sn, Fe, Co, Cr, Ni, Nb, Cu, Mo, Mn, Pd, Ru, Zr, Ir, Rh, or V. Alloy particles may be formed by using a corresponding mixture of metal precursors.

For example, a cobalt compound and platinum compound may both be catalytically reduced to form a platinum-cobalt alloy particle, and the alloy composition controlled by the ratio of the metal precursor compounds. In representative examples, metal particles may include alloys of platinum and at least one metal from the group consisting of Fe, Co, Pd, and Ni.

Support Materials

The support material may be carbon or other electrically conducting material such as an electron-conducting polymer, such as polymer having an electron-delocalized backbone, or in the alternative a metal oxide or a metal nitride. The support material may be particulate, a sheet, web, fibrous, or other form as desired. The support material, such as carbon black or other form of carbon, may be a commercial product, and may further be treated with ammonia or other gas prior to use.

Examples of the present invention include two approaches to locating the metal particles on the surface of the support material, firstly an in situ approach where metal particles are prepared in the presence of the support material, and secondly a "separated" method where metal particles are prepared separately from the support material, and then adsorbed onto the support material.

In Situ Preparation

Illustrative approaches to in situ preparation are now described, in which the photocatalyst is located on the surface of the support material, and the metal particles form in situ on the surface of the support material.

In a first approach, photocatalytic molecules are dispersed on the surface of a carbon support. Under visible/UV light, the carbon support is mixed in solution with a metal precursor and a reductant. Alternatively, the metal precursor may be added dropwise. The resulting suspension is filtered to obtain a solid material, and the solid material is then dried to obtain a final product.

In a second in situ preparation method, molecules of the photocatalytic material are dispersed on the surface of a carbon support. Under visible/UV light, the carbon support is mixed in solution with the metal precursor and reductant. Alternatively the metal precursor is added dropwise. The suspension is filtered to obtain a solid material. The solid material is then dispersed into a solution, for example in chloroform, to dissolve organic components such as porphyrin. The suspension is filtered again to obtain a second solid material, and this second solid is then dried to obtain the final product.

In a further in situ preparation, a solid material is obtained by filtering a suspension, as in the first method described above. The solid material is then heated in a pyrolysis method under ammonia or other gas to convert any residual organic materials to inorganic materials. For example, organic components (e.g. of the photocatalyst) may be converted to carbon by pyrolysis, and this carbon is added to the support material.

In the in situ preparation approach, the photocatalyst is highly dispersed on the surface of the support material, which may be carbon black. An impregnation method may be used. The carbon support can then be exposed to visible/ UV light and a solution including at least one metal precursors and at least one reductant.

A further treatment to the final product may be used to eliminate solvents and impurities. The concentration of metal, reaction time, and temperature can be controlled to obtain highly dispersed nanosized metal or alloy particles on the carbon support material. Further parameters which may be adjusted include photon absorption efficiency and the dispersion and amount of the photocatalyst.

"Separate" Preparation Method

The metal particles may be formed on the photocatalyst under visible/UV light, in a mixture including one or more metal precursors, a reductant, and the photocatalyst. The metal particles are formed prior to the introduction of the support material to the mixture. The formed metal particles are then dispersed on the surface of the carbon support. As above, a further treatment to the final product may be used to eliminate solvents and other impurities. Parameters, such as photocatalyst concentration, metal precursor concentration, reductant concentration, illumination time, and temperature can be controlled in order to obtain highly dispersed, nanosized metal or alloy particles.

In one approach, a mixture (for example, a suspension or solution) is provided including one or more of each of the following: a metal compound (metal precursor that is subsequently reduced to metal), a reductant (reductant), and a photocatalyst. The mixture is illuminated, exposed to visible and/or UV light. The metal precursors can be added dropwise. Metal particles are formed by reduction of the metal compounds, and the resulting suspension of metal particles is mixed with a second suspension comprising the support material, forming a suspension including the support material, the metal particles, and the photocatalyst. The second suspension may be a suspension of carbon particles. This combined suspension is then filtered to obtain a solid material, in which the support material becomes a support for the metal particles, and the solid is then dried to obtain the final product. Pyrolysis can be used to convert any residual organic materials to carbon.

A second approach is now described. Under visible/UV light, a metal precursor, reductant, and photocatalyst are mixed to form a suspension/solution. The metal precursors may be added dropwise. This suspension is mixed with a second suspension including the carbon support to form a new suspension. The new suspension is then filtered to obtain a solid material. So far this method is similar to that of the first separate method. The solid material is then dispersed in a solution, such as in chloroform, to dissolve organic compounds such as porphyrin. This suspension is then filtered to obtain a new solid material. The new solid material is then dried to obtain the final product.

A third approach is now described. This preparation method is similar to the first approach described above. However the solid material obtained by filtering the suspension is then subjected to a heat treatment, such as pyrolysis, for example under ammonia or other gas to form a final product that is an entirely inorganic material in which organic components have been converted to carbon.

A fourth approach is now described. Under visible/UV light, a metal precursor, reductant, and photocatalyst are mixed to form a suspension/solution with metal seeds therein. The metal precursors may be added dropwise. The metal seeds are removed from the suspension/solution and then mixed with a second suspension including the carbon support, a reductant and additional metal precursor to form a new suspension. The new suspension is then filtered to obtain a solid material. The solid material is then dried to obtain the final product.

Pyrolysis

The electrocatalyst can include organic-inorganic hybrid materials, such as the photocatalyst used to seed the metal particle formation, and can be used in a fuel cell as long as the presence of the organic compound does not degrade fuel cell performance. However, a further thermal treatment such as pyrolysis can be used to convert organic components into carbon, the carbon effectively becoming additional support material for the metal particles. The thermal method forms structural catalytic sites on the surface of the carbon, as illustrated below:

Scheme I

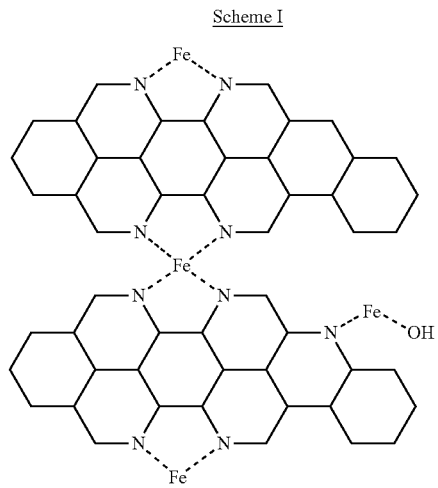

Scheme I above illustrates the formation of iron-nitrogen centers formed on a carbon support material using a pyrolysis method. Such metal sites are catalytically active for the oxygen reduction reaction (ORR), for example as shown by Anders Widelöv, "Pyrolysis of iron and cobalt porphyrins sublimated onto the surface of carbon black as a method to prepare catalysts for $O_2$ reduction", *Electrochimica Acta*, 2493-2502, 38(17) (1993), and in Lefèvre, M., Dodelet, J. P., Bertrand, P., "O-2 Reduction in PEM Fuel Cells: Activity and Active Site Structural Information for Catalysts Obtained by the Pyrolysis at High Temperature of Fe Precursors", *Journal of Physical Chemistry*, B104, 11238-11247 (2000).

Structural catalytic active sites can be formed by pyrolysis of one or more metal organometallic compounds, such as metalloporphyrins, on a carbon support or other support material. Scheme I only shows iron (Fe) present, but one or more metal species may be used, such as Pt, Sn, Fe, Co, Cr, Ni, Nb, Cu, Mo, Mn, Pd, Ru, Zr, Ir, Rh, or V.

Hence, metalloporphyrins, such as tin porphyrin, may be used as photocatalysts, and then a heat treatment such as pyrolysis used to produce catalytic sites on the surface of the support material. These catalytic sites may be used for oxygen reduction, for example in a fuel cell application. Alternatively, metal porphyrins or their homo- or hetero-aggregates may be used primarily as a photocatalyst, and another used primarily for formation of metal macrocycles on the surface of a support material.

Pyrolysis may occur under an atmosphere such as ammonia or nitrogen. Other metal particles may be deposited on the surface of the support, either prior to or after the pyrolysis step. One or more species of metalloporphyrins may be used, for example for photocatalysis-based formation of metal particles, and/or for production of catalysts for oxygen reduction. The term porphyrin, as used herein unless otherwise indicated, is not limited to the 20 carbon organic moiety but also includes porphyrin derivatives and related macrocyclic compounds.

EXAMPLES

In examples below, platinum particles (dendrites) were deposited on carbon black particles. However, the general approach may be applied to other metal particles on other support materials.

Example 1: Deposition of SnOEP on Carbon Black

Unlike chemical and photochemical reductions, a single photocatalyst can repeatedly reduce many metal cations to metal atoms, which can be deposited in the vicinity of the photocatalyst to form nanostructures. Hence, to grow platinum nanoparticles well dispersed on carbon black using an in-situ photocatalytic method, the first issue is how to evenly locate the photocatalyst molecules (in this example SnOEP, Sn (IV) octaethylporphyrin dichloride) on carbon black.

The carbon black used was hydrophobic and was difficult to suspend in water even after 5 minutes of mild sonication. However, the carbon black was readily suspended in chloroform. Given that SnOEP is also hydrophobic and can be readily dissolved in chloroform, the carbon black and SnOEP were both dissolved in chloroform, and then the solvent was slowly evaporated, making the dissolved SnOEP molecules deposit on the carbon black.

Using this evaporation method, SnOEP was successfully deposited on carbon black, which is ready for use in growing platinum nanostructures in situ. The distribution of platinum nanoparticles on carbon black discussed in Example 2 below (e.g. FIG. 3A) suggests that SnOEP is well dispersed on carbon black.

Example 2: Growing Pt Particles on Carbon Black

The photocatalytic method has been used to control the size and uniformity of platinum nanoparticles grown on surfactants, using ascorbic acid to reduce a platinum complex under tungsten light irradiation. In this example, platinum nanostructures were grown on carbon black, with size and uniformity control using the photocatalytic method.

Eighty minutes illumination of a stirred aqueous mixture (20 mL) containing SnOEP (0.4 mg) deposited on carbon black (10 mg) (prepared by the evaporation method), platinum complex (10 mM) and ascorbic acid (75 mM) led to a black slurry. When stirring was discontinued, a black precipitate settled to the bottom of the reaction vessel, and the supernatant was colorless and transparent. This suggests that the reaction is complete since the original color of the Pt complex is yellow. The colorless supernatant also indicates that most of the nanostructured Pt is associated with the carbon black.

Figure 2A:
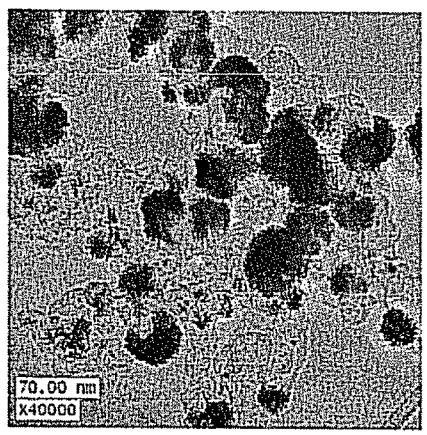
FIGS. 2A and 2B show TEM images of Pt nanoparticles grown on carbon black.
Figure 2B:
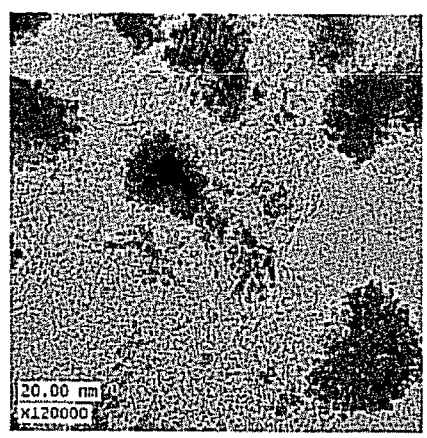

FIGS. 2A and 2B are transmission electron microscopy (TEM) images of platinum nanoparticles growing on carbon black at a low (a) and high (b) magnification (20 mL aqueous reaction mixture in 25 mL glass reaction vessel, 10 mg carbon black, 0.4 mg SnOEP or [SnOEP]=27.7 µM, [$K_2PtCl_4$]=10 mM, [AA]=75 mM).

Globular platinum dendrites were observed, and all the platinum dendrites were attached to carbon black, as shown in FIGS. 2A and 2B. The shape of the Pt nanoparticles matches the curvature of the carbon surface, indicating that the nanoparticles are grown on the carbon rather than attaching to the carbon after formation. There may be chemical connections between the Pt and carbon which enhance the stability of an electrocatalyst, and which would be desirable for fuel cell applications.

The product contains various sizes of nanoparticles ranging from 2-3 nm particles (embryonic particle) to large dendrites up to 70 nm in diameter (FIGS. 2A and 2B). The wide size distribution suggests that the photocatalytic reaction does not function as well in controlling size and uniformity as in the separated approach. Most likely, under the conditions used the carbon black absorbs most of the light and the tin (IV) porphyrin cannot efficiently sensitize the Pt growth reaction.

Figure 3A:
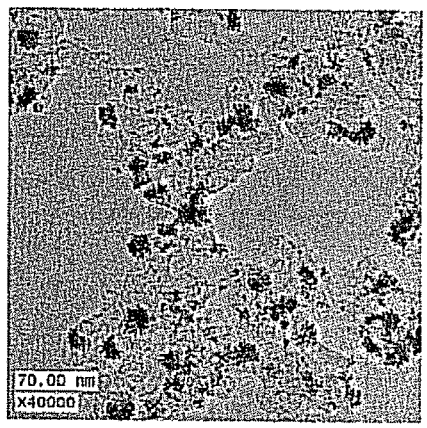
FIGS. 3A and 3B show TEM images of Pt nanoparticles growing on carbon black using a lower Pt complex concentration.
Figure 3B:
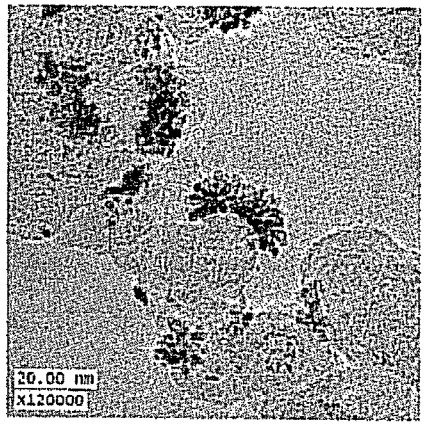

FIGS. 3A and 3B show TEM images of platinum nanoparticles grown on carbon black at a low (A) and high (B) magnification. (20 mL aqueous reaction mixture in 25 mL glass reaction vessel, 10 mg carbon black, 0.4 mg SnOEP or [SnOEP]=27.7 µM, [$K_2PtCl_4$]=2 mM, [AA]=75 mM). At a lower concentration of platinum complex, corresponding to 45% platinum loading (weight) on carbon, the nanoparticles have a smaller average diameter but still show a wide size distribution as shown in FIGS. 3A and 3B.

In this method for growing platinum nanoparticles on carbon black, all the platinum as prepared was associated with carbon black and was well dispersed.

Example 3: Effect of Titration Method on Pt Particle Formation

A two-step titration of platinum complex led to the size reduction of Pt particles on carbon black. To reduce the average size, the platinum complex stock solution, which can provide a 45 wt % Pt loading on carbon, was reduced on carbon black by two-step addition of the Pt complex to the reaction vessel.

10.2 mg of CB, 1.1 mL of 20 mM $K_2PtCl_4$ and 8.9 mL of water were added to a 25-mL glass vial and sonicated for five minutes. 10 mL of 0.15 M AA was then added and the reaction mixture was illuminated for 30 minutes under stirring. The obtained black slurry was then centrifuged and the supernatant was removed. The black precipitates were washed five times, each time with 20 mL of Nanopure water. The cleaned precipitate was dried in oven at 65° C. overnight. The powder was then added to a clean glass vial. 1.1 mL of 20 mM $K_2PtCl_4$ and 8.9 mL of water was added and the mixture was sonicated for 5 minutes. 10 mL of 0.15 M AA was added and the mixture was stirred and illuminated for 30 minutes.

Figure 4A:
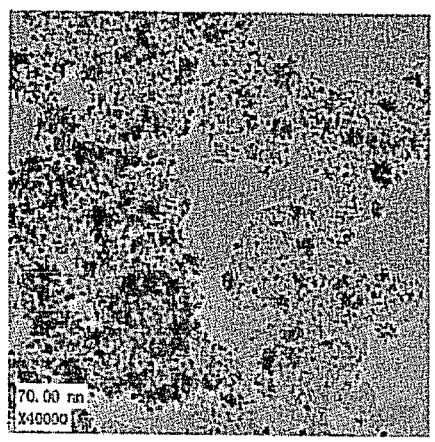
FIGS. 4A and 4B shows the TEM image of Pt nanoparticles synthesized using a titration method and a non-titration method.
Figure 4B:
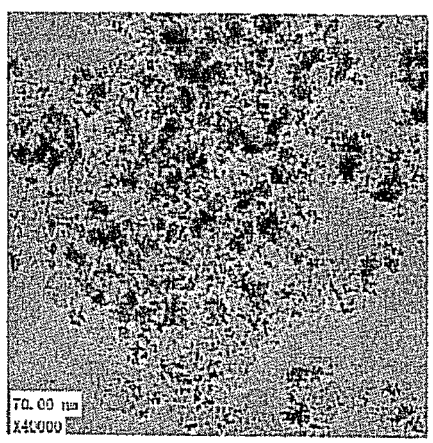

FIG. 4A shows TEM image of platinum nanoparticles synthesized using titration method (25 mL glass vial, 10.2 mg carbon black, [$K_2PtCl_4$]$_{total}$=2 mM, [AA]=75 mM), whereas FIG. 4B shows a TEM image of platinum nanoparticles prepared using the previous method (25 mL glass vial, 11 mg carbon black, [$K_2PtCl_4$]=2 mM, [AA]=75 mM).

The average size of the Pt particles (FIG. 4A) prepared using a titration method appears to be smaller than that of particles prepared using the previous method (FIG. 4B).

The titration method may be viewed as a seeding method. Namely, the first addition of the metal source led to the formation of platinum seeds, which then autocatalytically grew into larger nanostructures as the second half of the platinum complex was added. The size reduction of the titration method may be due to one or more of the following factors: the low concentration of the platinum complex might help form more nucleation sites and simultaneously suppress the autocatalytic growth of each nucleation site; the nucleation sites formed during the first titration might somehow lose autocatalytic property due to the removal of species during cleaning method, such as Cl⁻ or oxidized AA, which may be important for autocatalytic growth of the particles; or the autocatalytic property of the particles on carbon black is not as good as those of the unsupported ones. However, the exact mechanism is unclear.

Example 4: Effect of Different Reductants on the Synthesis of Platinum Nanoparticles on Carbon Black In the previous examples, ascorbic acid was used as the reductant to synthesize platinum nanostructures on carbon. Herein, the synthetic systems are extended to use two alternative reductants (NaBH$_4$ and NH$_2$—NH$_2$). Unlike ascorbic acid, these strong reductants rapidly reduce the Pt complex, and the reaction may be too fast for photocatalytic control, leading to non-dendritic growth and less uniform particle sizes.

10 mg carbon black and 10 mL of aged 2 mM K$_2$PtCl$_4$ aqueous solution were added to a 25-mL glass vial, followed by sonication for 5 minutes to allow the suspension of carbon black in the mixture. The addition of 10 mL of 150 mM ascorbic acid, sodium borohydride, or hydrazine led to a black slurry under illumination and stirring for 30 minutes. After discontinuation of the stirring, a black precipitate and colorless supernatant were observed, indicating that the reduction was complete.

Figure 5A:
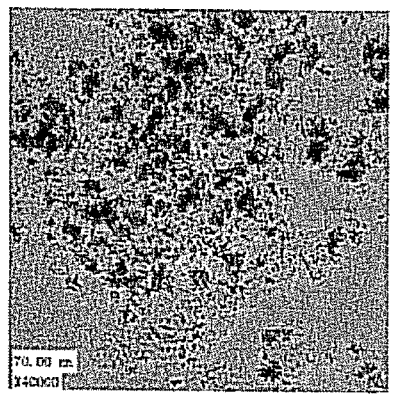
FIGS. 5A-5F show TEM images of Pt nanostructures synthesized on carbon black using various reductants.
Figure 5B:
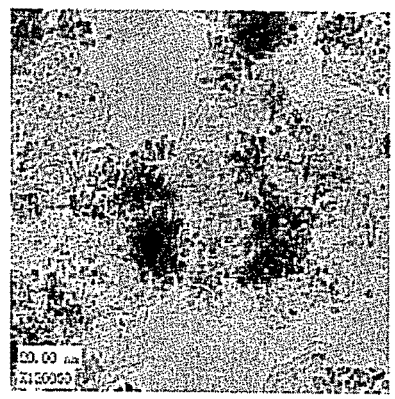
Figure 5C:
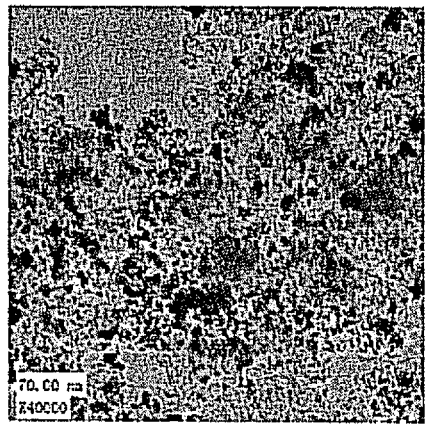
Figure 5D:
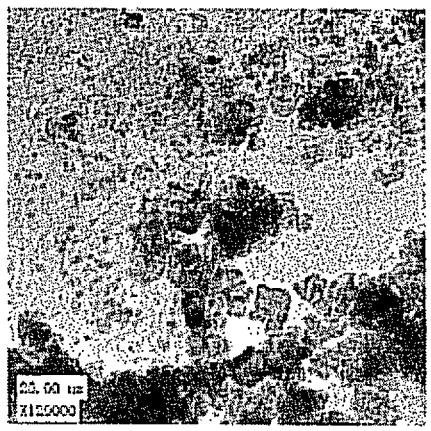
Figure 5E:
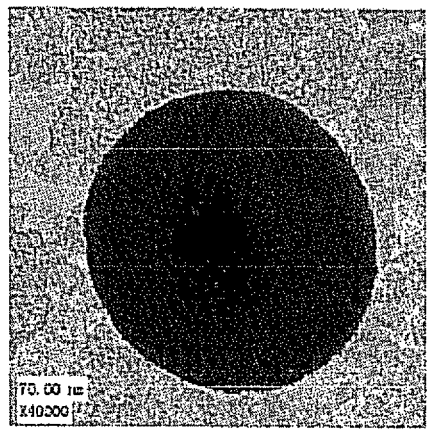
Figure 5F:
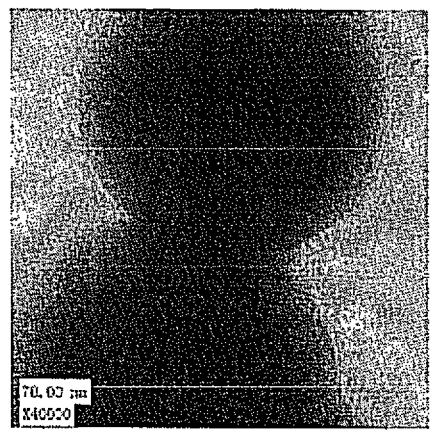

When 75 mM of ascorbic acid was used as the reductant, most of the platinum nanoparticles were grown on carbon black as shown in FIG. 5A. FIG. 5B more clearly shows that the particles have a size distribution including 2-3 nm particles and larger particles up to 35 nm in diameter. As the same concentration of sodium borohydride was used in the synthesis, similarly almost all of the platinum has been reduced on carbon. However, the resultant nano-scaled platinum particles are not Pt dendrites, and have less regular shapes and a have wider size distribution in the range from 2 to 50 nm (FIGS. 5C and 5D). Using hydrazine as the reductant, only large platinum nanospheres with a diameter of about 500 nm were obtained, as shown in FIGS. 5E and 5F. It is uncertain whether the nanospheres were grown on carbon or not.

Taking into account of the size and shape control of the nanostructured platinum, the photocatalytic reaction system of ascorbic acid, tetrachloroplatinate potassium and carbon black is preferred. Ascorbic acid may play a role for the formation of platinum nanoparticles, such as encouraging dendritic growth via a weak surface interaction with the platinum. The structure of ascorbic acid does not contain a strong ligation atom, such as nitrogen atoms in hydrazine.

In summary, FIGS. 5A-5F show TEM images of platinum nanostructures synthesized using various reductants on carbon black. (A) and (B) with ascorbic acid (25 mL glass vial, 11 mg carbon black, [K$_2$PtCl$_4$]=2 mM, [AA]=75 mM); (C) and (D) with NaBH$_4$ (25-mL glass vial, 11 mg carbon black, [K$_2$PtCl$_4$]=2 mM, [NaBH4]=75 mM); (E) and (F) with NH$_2$—NH$_2$ (25 mL glass vial, 9 mg carbon black, [K$_2$PtCl$_4$]=2 mM, [N2H4]=75 mM). All these reductants can be successfully used to reduce the platinum complex, but it appears that ascorbic acid gives the best size and shape control, especially when a photocatalyst is employed.

Example 5: Surfactant Effect on Fuel Cell Performance of Globular Platinum Nanoparticles Grown on Carbon Black It has been shown that a high concentration of SnOEP dissolved in SDS micelles leads to increased size reduction in the platinum nanoparticles due to a better light absorbance by the large amount of SnOEP on the surface. In other words, use of a surfactant provides a promising avenue to overcome the light absorbance issue introduced by the presence of carbon black. However, it was not yet clear whether the presence of SDS has any influence on the fuel cell performance of the as-prepared platinum particles. The following focuses on the SDS effect on fuel cell performance.

100 mg of carbon black was added to 100 mL of 0.15 M ascorbic acid aqueous solution and the mixture was sonicated for 10 minutes to suspend the carbon black. 22 mL of 20 mM aged K$_2$PtCl$_4$ aqueous salt and 78 mL of water were then added. The mixture was stirred and illuminated with a dual light source for 1 hour. After discontinuation of the stirring, colorless supernatant and black precipitate at the bottom of the reaction vessel were observed. The supernatant was mechanically removed. The remaining black slurry was then transferred into two 45 mL centrifuge tubes. To each tube was added 50 mL Nanopure water, followed by vortexing at 3500 RPM for 10 minutes and centrifugation at 3500 RPM for two minutes to precipitate out the products. Again, the 45 mL of supernatant was removed. This purification method was repeated for each tube for 5 times. The obtained products were then left in an oven at 65° C. to dry overnight. The total weight of the dried product was 0.186 g.

Membrane electrode assemblies (MEAs) were prepared using the above catalyst, 45 wt % platinum nanoparticles grown on carbon black, with and without the subsequent addition of SDS to the electrode ink. This procedure gives the same type and concentration of Pt particles on the surface, and determines the effect of surfactant applied after the particles are grown.

The electrode ink for one side of an electrode consisted of: 16.7 mg of the catalyst (45 wt % platinum nanostructures on carbon black); 133 mg Nafion solution (Aldrich, 5 wt % Nafion); 600 mg 18 MΩ water; 500 mg reagent grade isopropyl alcohol; and 0 or 13.8 mg (40 mM) SDS for SDS free and SDS containing electrode, respectively.

The electrode ink was sonicated for 20-30 seconds to disperse the catalyst particles, and then the ink was brush-painted onto a Nafion 112 membrane, which was held flat on a vacuum hot plate at 60° C. This method resulted in a platinum loading of approximately 1 mg/cm$^2$ on one side of the electrode after accounting for waste. The other side of the electrode was painted using the same recipe and procedure. After drying, the two MEAs (with and without SDS) were put into the standard fuel cell test hardware (Fuel Cell Technologies) with SGL 21BC carbon paper as gas diffusion and backing layers.

The MEAs were hydrated under hydrogen (anode) and nitrogen (cathode) at 25° C. and 100% RH for 2 hours. Cyclic voltammograms were acquired to obtain a qualitative measurement of the electrochemically active surface area (ECA) of both the SDS free electrode and the SDS containing electrode.

Figure 6:
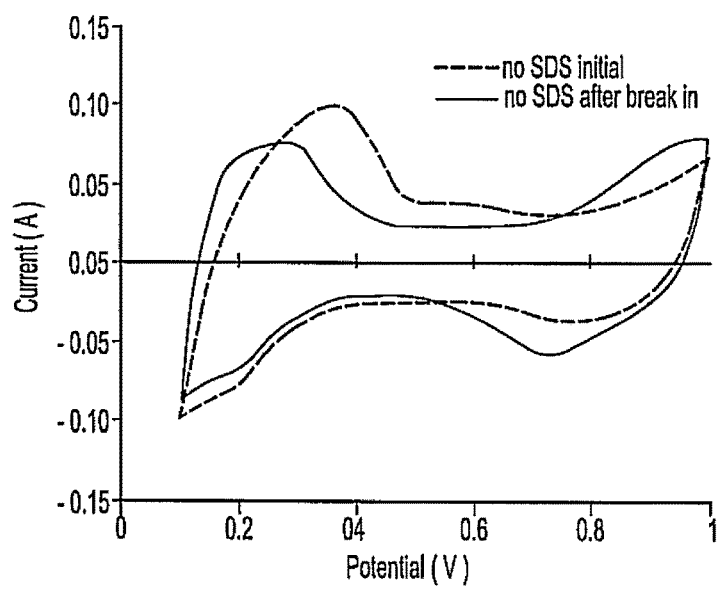
FIG. 6 shows CV curves of a non-SDS containing Pt electrode.
Figure 7:
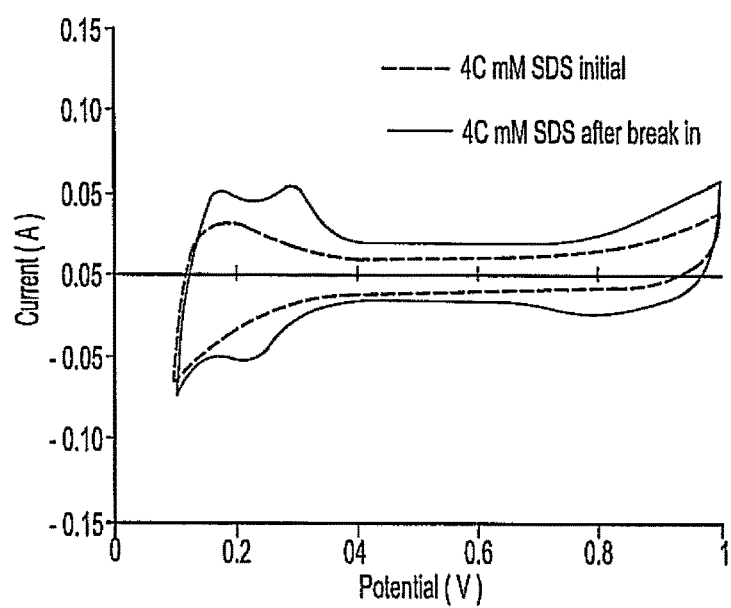
FIG. 7 shows CV curves of a 40 mM SDS containing Pt electrode.

FIGS. 6 and 7 show initial CVs of the non-SDS and SDS electrode, respectively. FIG. 6 shows CV curves of a non-SDS Pt electrode before and after break-in and performance testing, and FIG. 7 shows CV curves a of 40 mM SDS Pt electrode before and after break-in and performance testing. Comparing the two curves, the peak current of the SDS electrode is much smaller than that of the SDS free electrode, 0.03 versus 0.1 A. After the initial CV at 25° C., each cell was heated to 80° C. and 100% RH.

Figure 8:
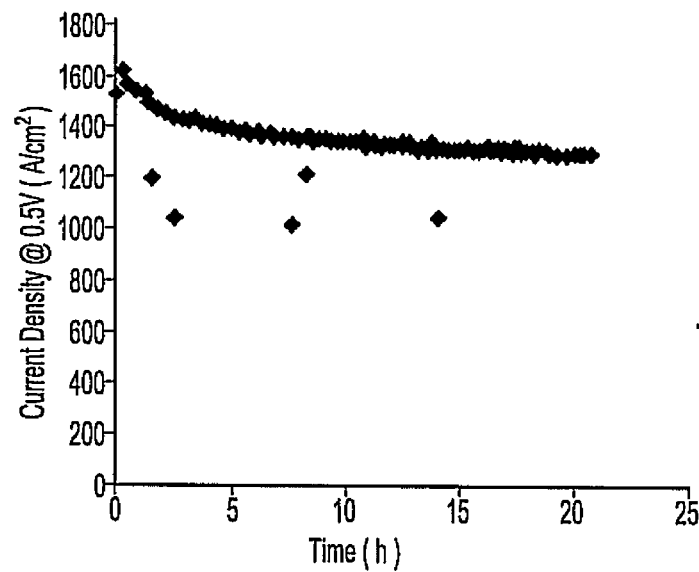
FIG. 8 shows a break-in curve at 0.5V for a non-SDS cell.

For the SDS-free cell, a voltage of 0.5V was drawn and the current over time was recorded to measure the break-in behavior of this cell. FIG. 8 shows the break-in curve at 0.5 V for the SDS-free cell. The current initially increases and then begins to slowly decline over the course of the test. For the platinum particles grown on carbon black, heat treatment can be used to stabilize the performance of the electrode. At any rate, the performance of this cell, approximately 1300 mA/cm$^2$ at 0.5 V, is reasonable good for this unoptimized MEA preparation.

Figure 9:
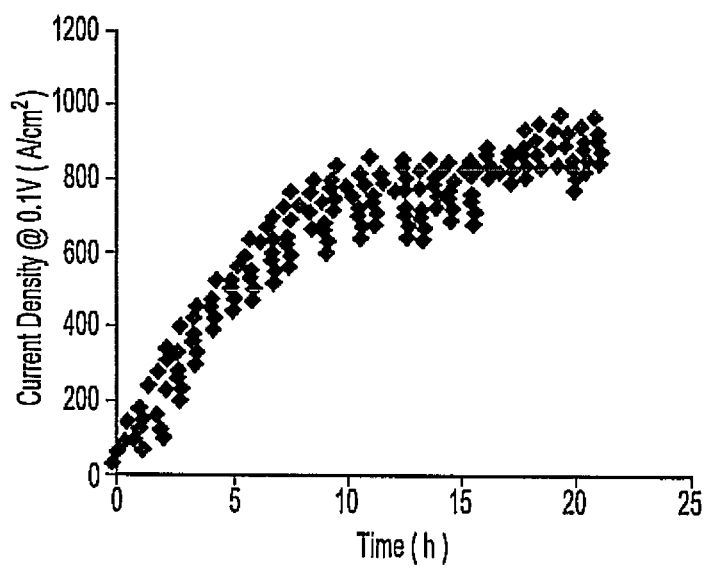
FIG. 9 shows a break-in curve at 0.1V for a SDS-containing cell.

FIG. 9 shows the break-in curve with a 0.1 V applied potential for the SDS-containing electrode. The low potential was required in this case because the performance of this electrode was so low. In fact, the open circuit voltage of this cell was just over 0.5 V when the break-in began. If the cell was broken in at a higher voltage than 0.1 V, no current would be produced.

As can be seen in FIG. 9, the current density at 0.1 V slowly increased over the course of the 21 hour test. This is probably an indication of the SDS containing electrode cleaning itself during fuel cell operation. The mode of cleaning remains unknown, but it is likely that the SDS was slowly oxidized at platinum reaction sites over time.

The performance of each cell after the break-in period is shown in FIG. 10. The SDS containing cell clearly had much lower performance than the SDS-free cell, which was suggested by their slow break-in behavior.

Cyclic voltammetry was performed after the break in and performance test of each cell. In the case of the SDS-free cell, the ECA declined after break-in period and the performance test as is reflected by the lower peak current in the low voltage region of the CV. The slightly declining performance of the cell during break in is consistent with this observation. From a qualitative standpoint, the ECA of the SDS containing cell increased (higher peak currents) after the break-in and performance test period. This result might be expected if there was a cleaning method of the SDS containing electrode during the break-in period. The results show that 40-mM SDS in the electrode ink had a detrimental effect on the performance of the cell. The SDS containing cell performance was indicative of a contaminated platinum surface, presumably by the SDS surfactant. Some cleaning of the catalyst surface occurred during break-in and performance test, as evidenced by the increase of ECA during the course of test. However, the performance of the SDS-containing cell never approached that of the SDS-free cell. The ECA of the SDS-free cell decreased slightly during the test.

Example 6: Investigation of Pt—C Interfacial Interactions

Globular platinum particles were grown on carbon black. A typical TEM image shows (FIG. 11A) that the particles match the curvature of supporting carbon black, indicating the formation of chemical bonding at the Pt—C interface. The chemical bonding between nanostructured platinum and its supporting carbon black may be significant for fuel cell applications in that the bonding can slow down the degradation of the electrocatalyst and elongate its durability in fuel cell applications. Further studies were made of the Pt—C interface.

Platinum particles grown on carbon black were separated by centrifugation at 3000 rpm for 2 minutes, followed by removal of the supernatant, addition of fresh nanopure water and re-suspension of the products by mild sonication. This procedure was repeated for three times to be certain that all the by products were removed. The cleaned materials were dried in oven at 65° C. for overnight before XPS measurements.

FIG. 11B shows a doublet peak containing a low energy band (4f7/2) at 71.9 eV, and a high-energy band (4f5/2) centering at 3.3 eV higher. The two broad bands could be curve-fitted to two pairs of Pt4f peaks at 72.0, 75.4 and at 73.6, 77.5 eV, respectively. They all have a spin-orbit splitting of the 4f7/2 and 4f5/2 states. There are therefore two different Pt oxidation states, namely, Pt (0) and Pt (>0), each contributing to two peaks in the resultant XPS spectrum. This could indicate chemical bonding at Pt—C interface, but may also arise from Pt—O bonding.

Figure 12C:
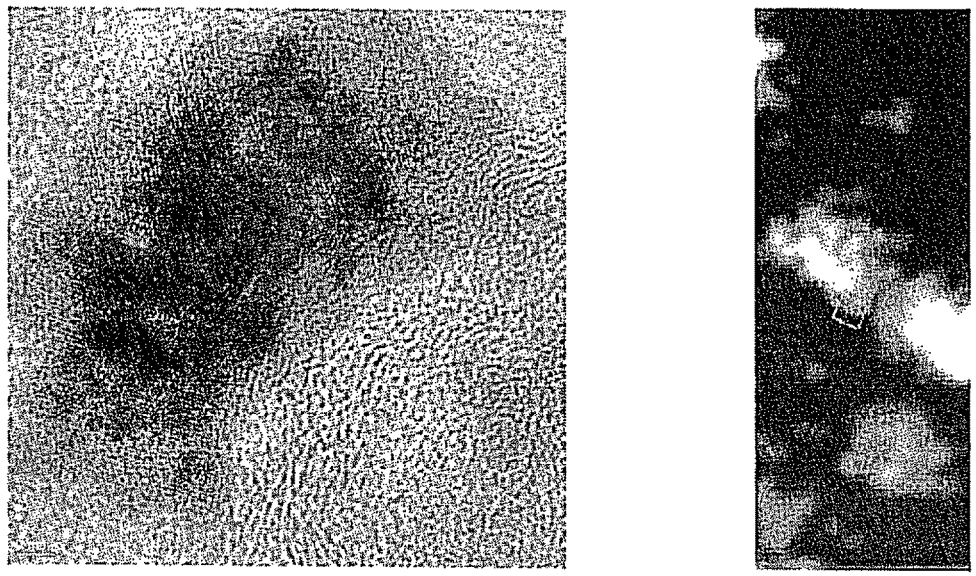
Figure 12C:
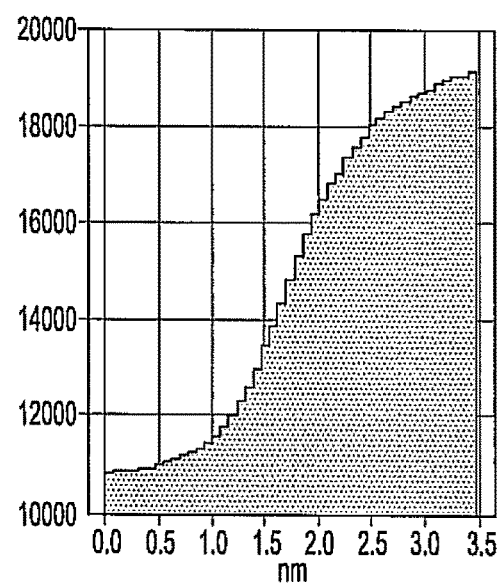
Figure 13A:
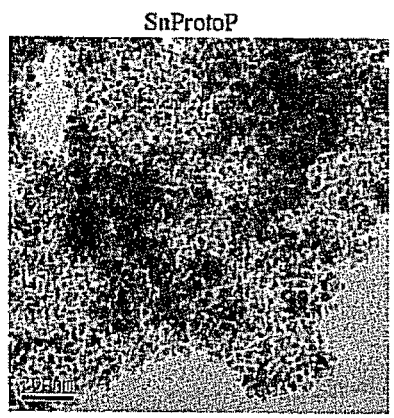
FIGS. 13A-13E show high resolution TEM images of Pt seeds formed using different photocatalyst, namely: 13(A) SnProtoP; (13B) SnUroP; (13C) SnTCPP; (13D) SnN-MePyP; and (13E) SnTPPS4.
Figure 13B:
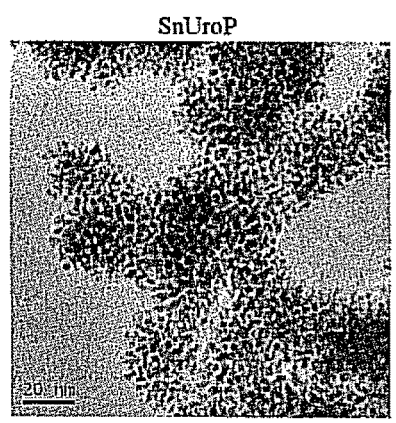
Figure 13C:
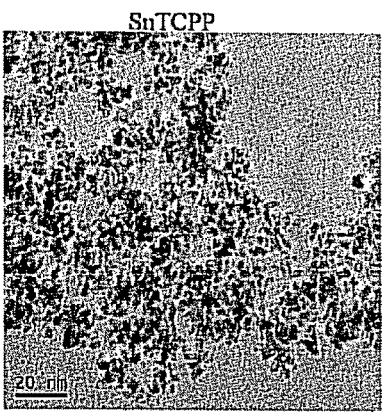
Figure 13D:
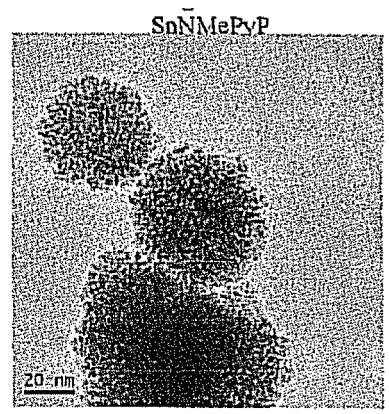
Figure 13E:
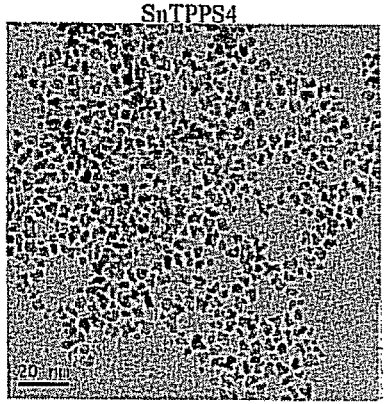

FIG. 12A is a HRTEM image that shows atomic fringing of platinum starts forming right at the carbon surface, and there might be some difference between Pt—C interface and bulk crystalline platinum in the fringing. FIG. 12B shows a STEM image, in which the lightness is related to the electron density. For a selected square Pt—C interface, the corresponding density profile clearly shows a density transition at the Pt—C interface, rather than a sudden jump. This indicates that there is a substance or compound at the interface with an electron density larger than carbon and less than pure platinum. However, these results may also arise from the formation of Pt—O bonds.

Taken together, the results suggest there is chemical bonding at the Pt—C interface.

Example 7: Effect of "Separate" Preparation Method on Pt Particle Formation

A two-step process where Pt seeds were produced prior to the introduction of carbon black led to increased control of the size and size distribution of Pt particles on the carbon black. The two-step process included a first step wherein a Pt-containing salt was mixed with a photocatalyst and a reductant and exposed to UV light. No carbon black was included in the first step and Pt seeds were produced. Thereafter, the Pt seeds were mixed with carbon black and subjected to sonication, followed by the addition of more reductant and Pt-containing salt and stirring.

2-Step Process Method Overview

In the 2-step process method used for electrocatalyst preparation, Pt seeds were prepared separately using a photocatalyst (step 1) followed by the Pt seed/photocatalyst system (Pt seeds) being supported on carbon for the Pt dendrite growth step (step 2). The method resulted in preparing electrocatalysts with nanodendrite Pt and afforded for Pt particle size control by varying the Pt seed/photocatalyst/carbon loading (i.e. sites for Pt dendrite growth) and/or decreasing the Pt seed size. A possible mechanism includes three basic steps: (1) preparation of the Pt seeds with bound tin porphyrin (SnP); (2) adsorption of the Pt seeds stabilized by SnP onto carbon black; and (3) growth of the Pt seeds into dendrites on the carbon black surfaces. In addition, it is suggested that the Pt seeds were stabilized by adsorbed SnP.

The Pt seed generation step included combining the photocatalyst (usually tin porphyrin) and the reductant (usually ascorbic acid) in a Pt solution (usually a K$_2$PtCl$_4$ solution), followed by exposure of the mixture to UV light for an extended period (typically 30 mins). This process resulted in Pt seed nucleation and growth. The mechanism for Pt seed formation through photocatalysis can be summarized by the chemical reaction equations below wherein the exposure of the SnP to light in the presence of absorbic acid (AA) and $Pt^{2+}$ ions results in Pt nucleation.

$$SnP + h\nu \rightarrow SnP^*$$

$$SnP^* + AA \rightarrow SnP^- + AA_{ox}$$

$$2SnP^- + Pt^{2+} \rightarrow 2SnP + Pt^0$$

The Pt nanodendrite growth step includes supporting the previously prepared Pt seeds on carbon black by means of sonication. Thereafter the Pt seeds supported on the carbon black are combined with a Pt solution and reductant in order to provide the final state of the electrocatalyst.

Effect of Tin Porphyrin (SnP) Photocatalyst Type on Pt Seed Preparation

Candidate photocatalysts were screened for application in the Pt seed preparation step with Sn (IV) porphyrins tested as a function of their charge characteristics. The various Sn (IV) porphyrins that were tested, sample names and results are summarized in Table 1.

TABLE 1

| Porphyrin Type | Sample | Charge | SnTPPS4 concentration (μM) | Observation | Pt Seed number |
|---|---|---|---|---|---|
| SnProtoP* | DFC80A | Neutral | 75.9 | Severe Pt aggregation | Unknown |
| SnUroP* | DFC80B | Neutral | 63.1 | Severe Pt aggregation | Unknown |
| SnTCPP* | DFC80C | Neutral | 70.8 | Less severe Pt aggregation | Unknown |
| SnNMePyP* | RFC71A | Positive | 100 | Very severe Pt aggregation | Unknown |
| SnTPPS4* | RFC71B | Negative | 168 | Separate Pt particles | Large |

*SnProtoP = Sn(IV) protonporphyrin IX, SnUroP = Sn(IV) Uroporphyrin 1, SnTCPP = Sn(IV) meso-tetra(4-carboxphenyl) porphyrin, SnNMePyP = Sn(IV) meso-tetra(N-methly4-pyridyl) porphyrin, SnTPPS4 = Sn(IV) meso-tetra(sulfonato-4-phenyl) porphyrin The Pt seeds were all prepared in 20 ml vials using 1 ml of 20 mM $K_2PtCl_4$, 264 mg of ascorbic acid, 9 ml of nanopure water and 10 ml of the selected Sn (IV) porphyrin. Note that the pH was adjusted to neutral for Pt seed preparations using SnProtoP, SnUroP and SnTCPP. The effect of the different photocatalysts on the Pt seed preparation is summarized in Table 1 with a visual representation shown in FIGS. 13A-13E. In summary, the charge of the Sn (IV) porphyrin photocatalyst played a key role on the physical properties of the Pt seeds with large aggregates of Pt seeds resulting from the use of Sn (IV) porphyrins having a neutral or positive charge. In contrast, separation of the Pt seeds was observed when the negatively charged porphyrin, SnTPPS4, was used to prepare the Pt seeds. It is speculated that the repulsive forces existing between the negatively charged Sn (IV) porphyrin molecules and the negatively charged Pt precursor ($K_2PtCl_4$) ions aid in the observed separation in Pt seeds. In addition, it is suggested that the SnTPPS4 serves as a capping agent on metal seeds, i.e. the metal seeds are capped by the SnTPPS4. This photocatalyst was selected as the standard for the electrocatalyst preparation using the 2-step process method.

Preparation of Pt Seeds Using Bi-Mixtures of Porphyrin Photocatalysts

Figure 14A:
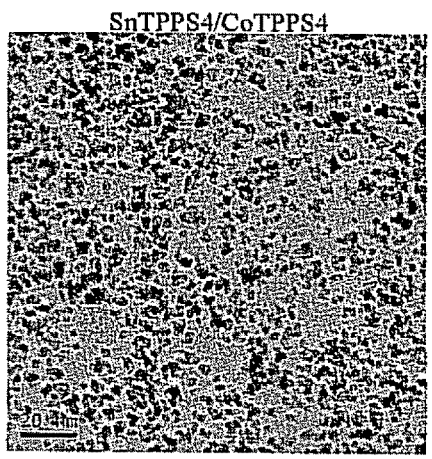
FIGS. 14A-14C show high resolution TEM images of Pt seeds formed using different bi-mixtures of porphyrin photocatalysts, namely: (14A) SnTPPS4/CoTPPS4; (14B) SnTPPS4/NiTPPS4; and (14C) SnTPPS4/FeTPPS4.
Figure 14B:
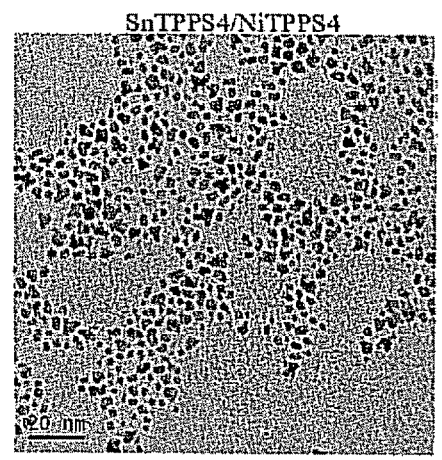
Figure 14C:
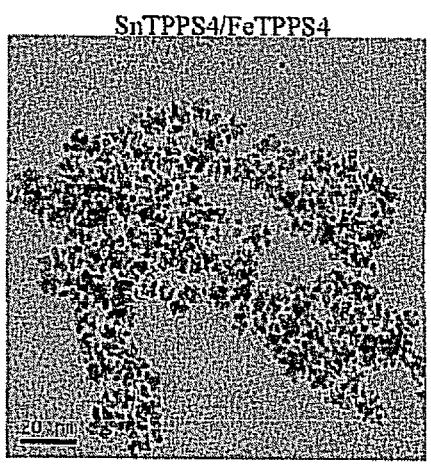

Several bi-mixtures of photocatalyst namely SnTPPS4/CoTPPS4, SnTPPS4/NiTPPS4, and SnTPPS4/FeTPPS4, were tested in order to investigate their effect on Pt seed preparation. Synthesis was completed by combining 5 mL of 168 μM SnTPPS4 (aq) with 5 mL of metallic porphyrin and 1 mL of 20 mM $K_2PtCl_4$. This mixture was briefly sonicated and 0.264 g of ascorbic acid was dissolved in 9 mL of nanopure water in a separated container. The two solutions were then combined and irradiated with dual light for 30 minutes under stirring. TEM images of the seeds prepared with the bi-mixed porphyrins are shown in FIGS. 14A-14C. The SnTPPS4/NiTPPS4 mixture gave the best results within these comparisons. Thus it is appreciated that bi-mixtures, tri-mixtures and the like can be used to produce Pt seeds. However, as stated above, the negatively charged porphyrin, SnTPPS4, was used to prepare the Pt seeds for the disclosed electro catalysts.

Effect of Pt Seed Amount of Pt Size

Figure 15A:
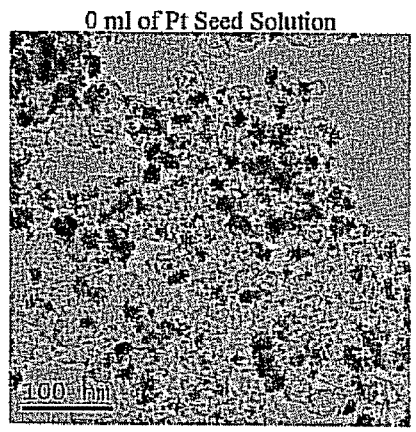
FIGS. 15A-15E show high resolution TEM images of Pt dendrites formed using different amounts of Pt seed solution, namely: (15A) 0 milliliters (ml) of Pt seed solution; (15B) 1 ml of Pt seed solution; (15C) 3 ml of Pt seed solution; (15D) 5 ml of Pt seed solution; and (15E) 10 ml of Pt seed solution.
Figure 15B:
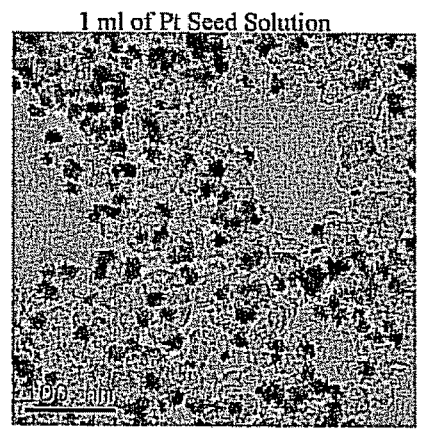
Figure 15C:
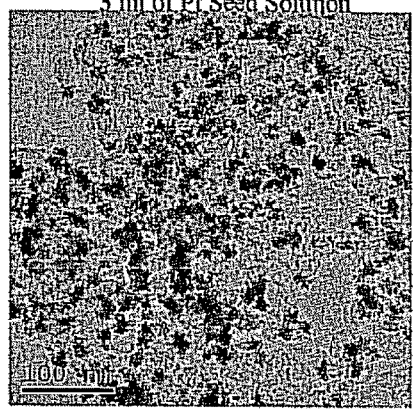
Figure 15D:
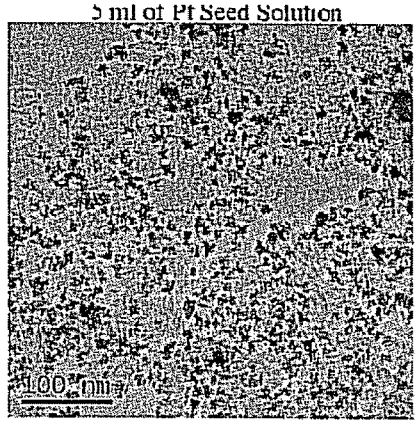
Figure 15E:
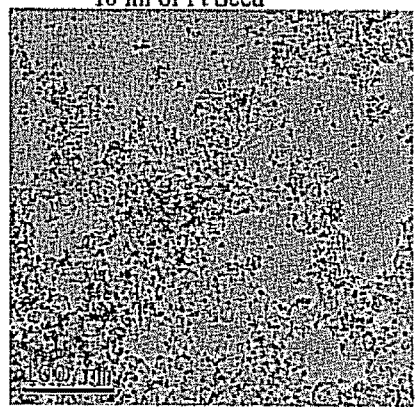

The Pt nanodendrite electrocatalysts were prepared following the procedure shown in Table 2 with the amount of Pt seed solution used to make different electrocatalyst samples shown in Table 3. FIGS. 15B-15E show the effect of varying the amount of Pt seed solution amount on the size of the Pt dendrites with FIG. 15A providing an image of an electrocatalyst prepared without Pt seeds for comparison. There is an apparent reduction in Pt dendrite size for the electrocatalyst prepared with 5 ml of Pt seed solution when compared to an electrocatalyst prepared with only 1 ml of Pt seed solution. In addition, further Pt dendrite size reduction was achieved when 10 ml of Pt seed solution was used in step 2. However, it is important to note that although the lowest apparent Pt dendrite size was obtained when 10 ml of Pt seed solution was used, this amount resulted in the poorest Pt dendrite/carbon black loading. This may have been due to a Pt seed/carbon black saturation limit between the 5 ml and 10 ml Pt seed solution amounts. The average size for 1, 3, and 5 ml Pt seed solution amounts are summarized in Table 4.

TABLE 2

1. Combine various amount of the Pt seeds from RFC71B (167 μM SnTPPS4, 1 mL 20 mM $K_2PtCl_4$) with 10 mg of carbon black and certain amounts of nanopure water, followed by 5 minutes of sonication.
2. Combine the above mixture with 10 mL of 0.15M AA.
3. Add in 2 ml amount of 20 mM $K_2PtCl_4$ (aq).
4. Allow to react under stirring for 1 hour.
5. Verify reaction completeness by UV-vis spectroscopy.

TABLE 3

| Electrocatalyst Type | Sample | Pt seed solution amount (ml) | $H_2O$ amount (ml) |
|---|---|---|---|
| Pt/SnTPPS4/C | RFC72A | 1 | 7 |
| | RFC72B | 3 | 5 |
| | RFC72C | 5 | 3 |
| | RFC86 | 10 | 8.8 |

TABLE 4

| Electrocatalyst Type | Sample | Pt seed solution amount (ml) | Average Pt size (nm) |
|---|---|---|---|
| Pt/SnTPPS4/C | N/A | 0 | 12-20$^a$ |
| | RFC72A | 1 | 17.6$^b$ |
| | RFC72B | 3 | 15.6$^b$ |

TABLE 4-continued

| Electrocatalyst Type | Sample | Pt seed solution amount (ml) | Average Pt size (nm) |
|---|---|---|---|
| | RFC72C | 5 | 12.1[b] |
| | RFC86 | 10 | <5[a] |

[a]Values correspond to Pt sizes estimated from TEM images in FIG. 9.
[b]Values were obtained by manually measuring 100 individual particles from prepared samples The 2-step process method used to prepare the electrocatalyst samples is summarized in Table 5 with a summary of electrocatalyst preparation conditions and relative concentrations of reactants shown in Table 6. As shown in Table 5, three electrocatalyst samples were prepared using a Ketjen carbon black and two electrocatalyst samples prepared using a Vulcan XC-72 carbon black. The process included preparing the Pt seed solution and supporting the Pt seeds on carbon black by sonication with subsequent Pt dendrite growth. In step 2, the Pt seeds were added to carbon as solution amounts. All samples were then washed and dried using the procedure summarized in Table 7. Note that Sample RFC 106 was washed in ethanol to remove SnTPPS4 following the washing and drying procedure summarized in Table 7 with the number of washes summarized in Table 8. The weight of all samples and final yield of electrocatalyst product determined for all the samples after the washing and drying process is shown in Table 9. The weight loss of the prepared electrocatalysts is mainly attributed to the washing and drying process.

Analytical Techniques

TEM was used for Pt size measurements, DPT-TGA was used for wt % determination, and XRD was used for crystalline state information. DTA/TGA was performed using a STD 2960 DTA/TGA-DSC 2010 with dried air as the processing atmosphere and a heating rage of 10° C./min.

TABLE 5

| Sample set | Purpose | Electrocatalyst type | Pt seed solution amount (ml) | Weight % Pt | Sample name |
|---|---|---|---|---|---|
| 1 | Investigate Pt size effect | Pt/SnTPPS4/C | 1 | 45 | DFC91 |
| | | Pt/SnTPPS4/C | 5 | 45 | DFC90 |
| | | Pt/SnTPPS4/C (washed with ethanol) | 5 | 45 | RFC106 |
| 2 | Investigate effect of Pt shape | Pt/SnTPPS4/Vu | 3 | 20 | RFC104 |
| | | Pt/SnTPPS4/Vu | 3 | 40 | RFC105 |

C = Ketjen carbon black, Vu = Vulcan carbon black, SnTPPS4 = Sn (IV) meso-tetra (sulfonato-s-phenyl) porphyrin

TABLE 6

| Steps | Actions | Items | Ingredients | Amounts | Preparation |
|---|---|---|---|---|---|
| 1 | Pt seed stock solution preparation | 1 | SnTPP4 (168 μM) | 10 ml | Items (1), (2), (3), and (4) were combined into 20 ml vial and illuminated under dual light for 30 minutes |
| | | 2 | $K_2PtCl_4$ solution (aged 20 mM) | 0.5 ml | |
| | | 3 | Ascorbic acid | 0.264 g | |
| | | 4 | Water (nanopure) | 9.5 ml | |
| 2 | Support Pt seeds on carbon | 1 | Carbon | * 240 mg (DFC91) 80 mg (DFC90) 80 mg (RFC106) 80 mg (RFC104) 80 mg (RFC105) | Items (1), (2), and (3) were combined and sonicated for 5 minutes |
| | | 2 | Pt seed stock solution (from Step 1) | 24 ml (DFC91) 40 ml (DFC90) 40 ml (RFC106) 24 ml (RFC104) 24 ml (RFC105) | |
| | | 3 | Water (nanopure) | 166.8 ml (DFC91) 24 ml (DFC90) 24 ml (RFC106) 52 ml (RFC104) 43.5 ml (RFC105) | |
| | Grow Pt on carbon black | 4 | Ascorbic acid (0.15M) | 240 ml (DFC91) 80 ml (DFC90) 80 ml (RFC106) 80 ml (RFC104) 80 ml (RFC105) | Items (4) and (5) were added to the mixture from above under stirring and allowed to react for 12 hours |
| | | 5 | $K_2PtCl_4$ solution (20 mM) | 49.2 ml (DFC91) 14.8 ml (DFC90) 14.8 ml (RFC106) 3.93 ml (RFC104) 12.5 ml (RFC105) | |

* Sample DFC91 was prepared in one batch, all other samples were prepared in 3 batches.

TABLE 7

| Steps | Procedure |
|---|---|
| Supernatant separation | 1) All batch samples from the 2-step process were combined<br>2) The mixture was centrifuged at 4,000 rpms to remove supernatant solution |
| Washing with water | 1) 200 ml of fresh nanopure water was then added to the products of the pre-wash step<br>2) The products from (1) were added to 4 centrifuge tubes<br>3) The products were centrifuged at 4,000 rpms for 30 minutes |
| Drying | All samples were dried in a vacuum oven at 65° C. for 12 hrs, following the washing step |

TABLE 7-continued

| Steps | Procedure |
|---|---|
| Washing in ethanol* | 1) The dried sample was washed 8 times in 10 ml of 10% ethanol in water<br>2) After (1) the sample was washed 2 more times in 45 ml of 10% ethanol in water |

*This part of the washing and drying process was only applied to Sample RFC106

TABLE 8

| Sample name | Number of washes |
|---|---|
| DFC91 | 8 |
| DFC90 | 7 |
| RFC106 | 10 |
| RFC104 | 9 |
| RFC105 | 8 |

TABLE 9

Figure 17A:
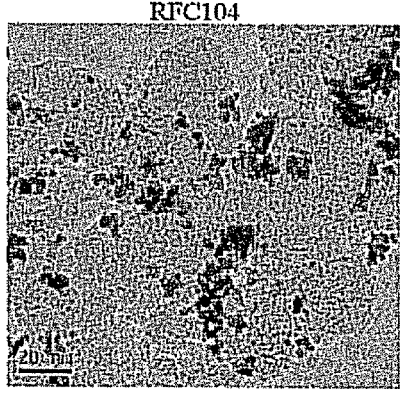
FIGS. 17A-17B show high resolution TEM images of Pt dendrites on Vulcan carbon black for various electrocatalyst samples, namely: (17A) RFC104; and RFC105.
Figure 17B:
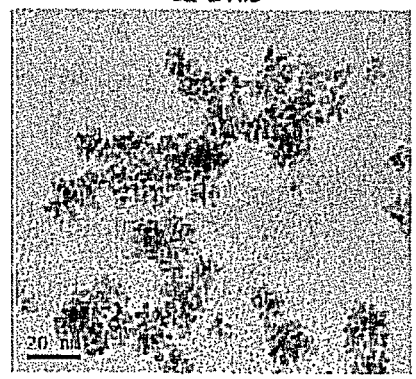
Figure 18A:
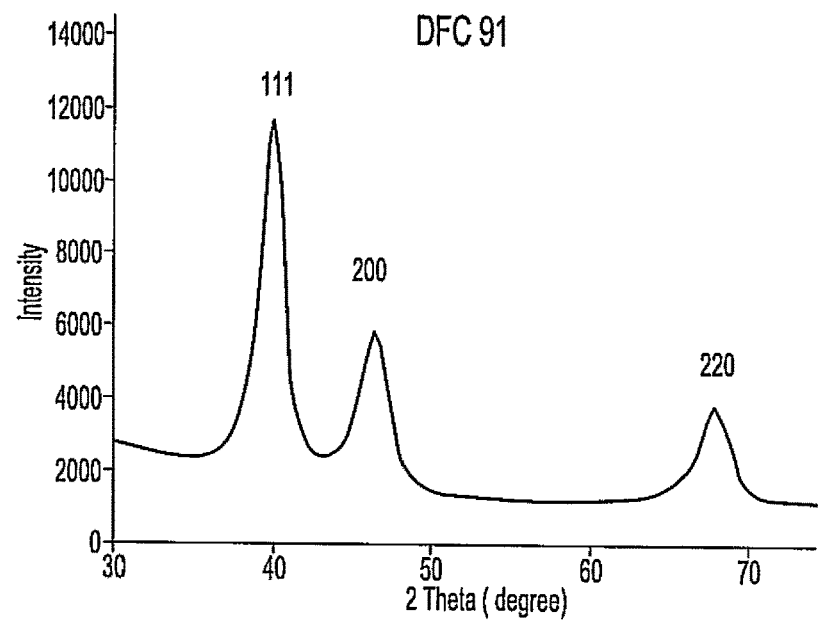
FIGS. 18A-18E show x-ray diffraction patterns for various electrocatalyst samples, namely: (18A) DFC91; (18B) DFC90; (18C) RFC106; (18D) RFC104; and (18E) RFC105.
Figure 18B:
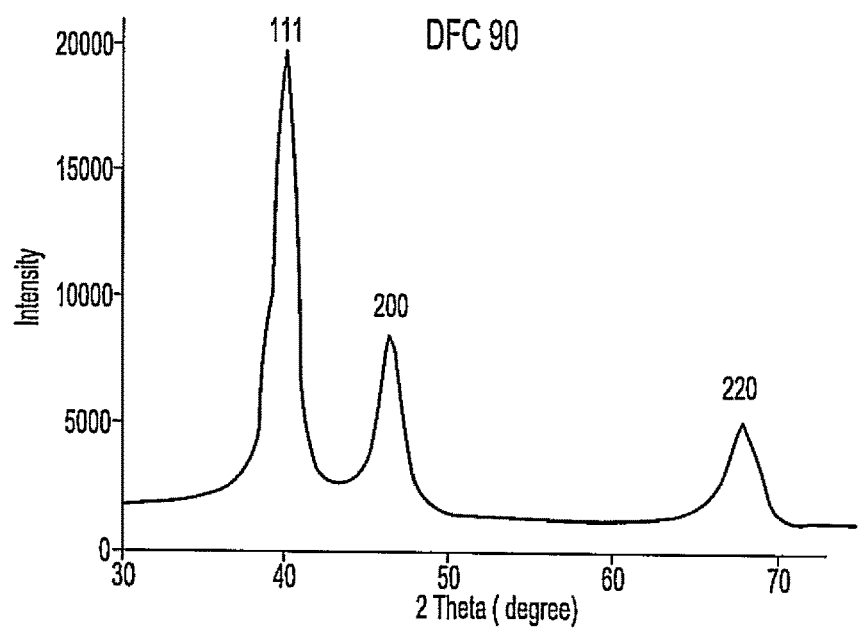
Figure 18C:
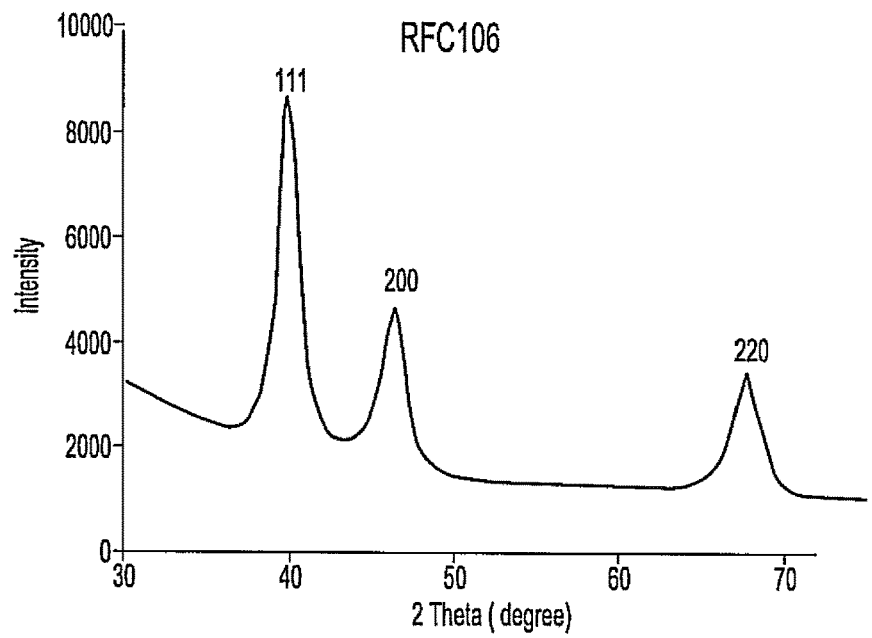
Figure 18D:
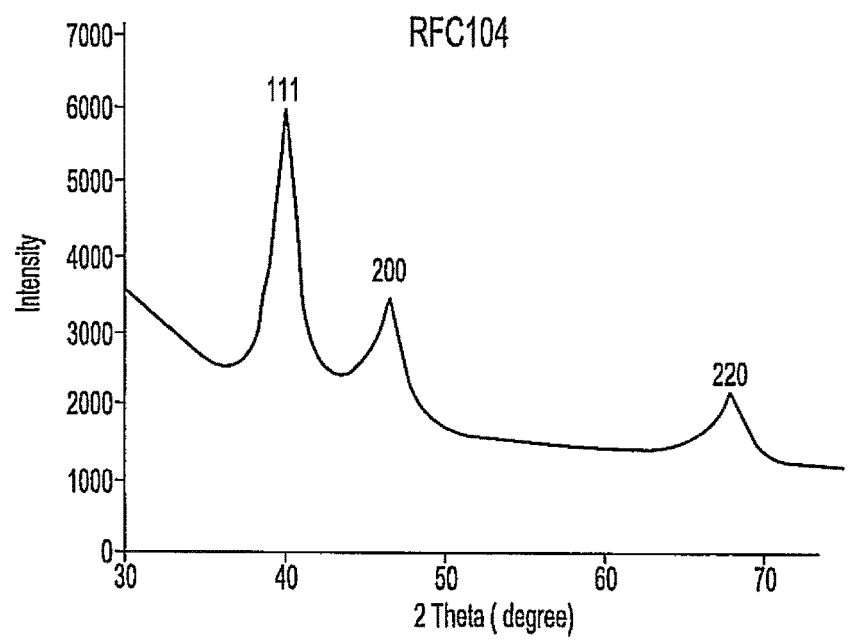
Figure 18E:
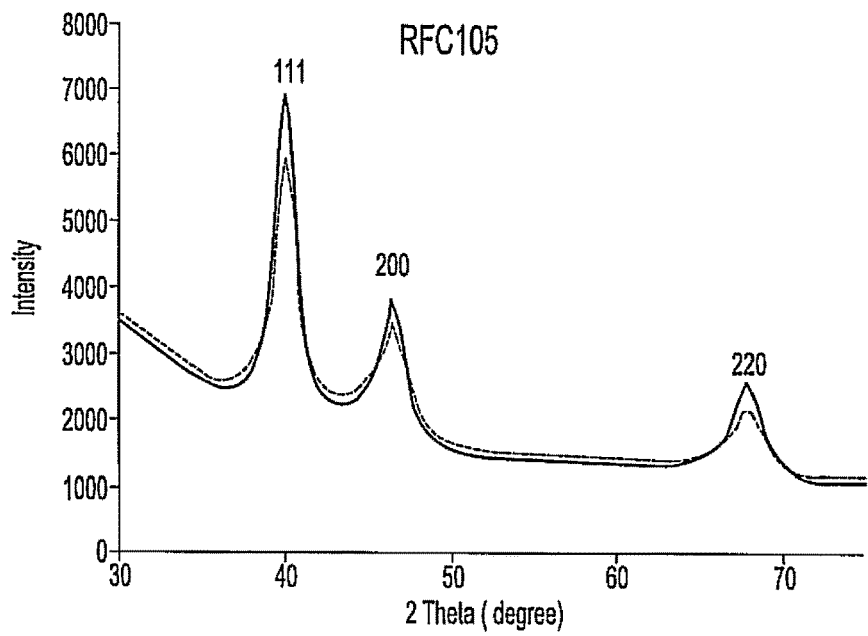
Figure 19A:
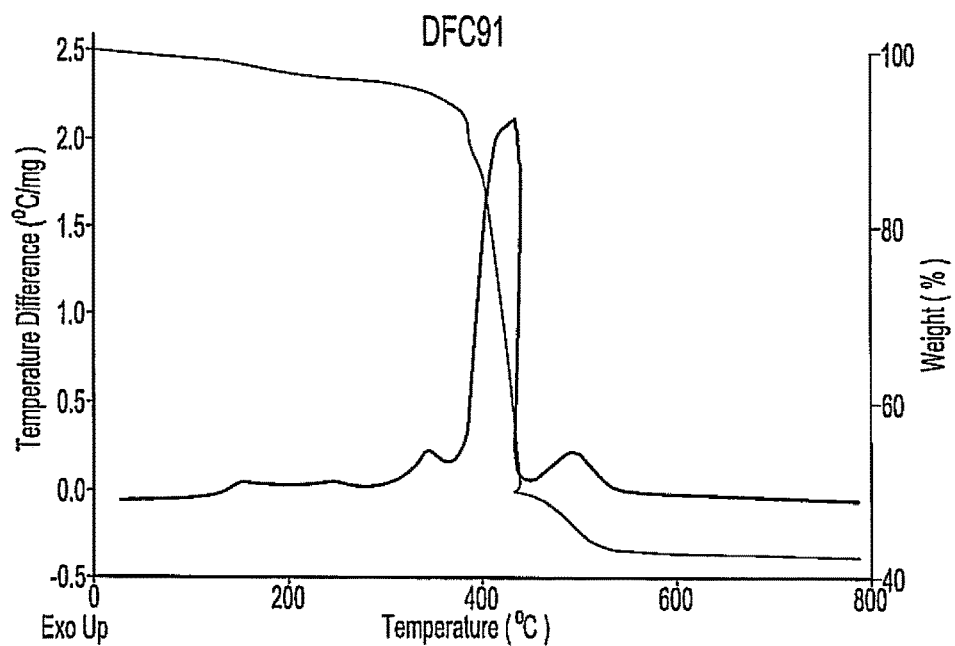
FIGS. 19A-19E show differential thermal analysis and thermal gravimetric analysis scans for various electrocatalyst samples, namely: (18A) DFC91; (18B) DFC90; (18C) RFC106; (18D) RFC104; and (18E) RFC105.
Figure 19B:
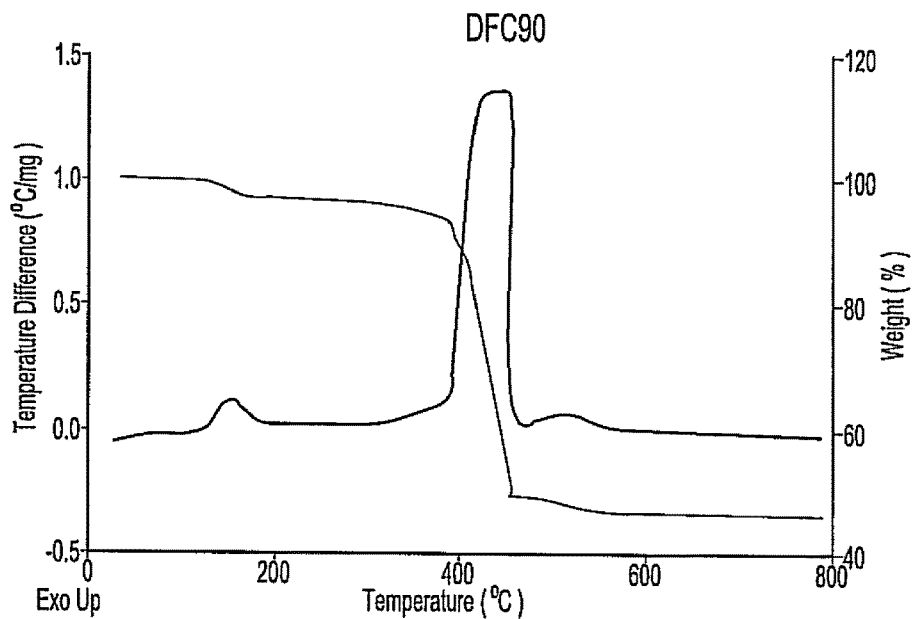
Figure 19C:
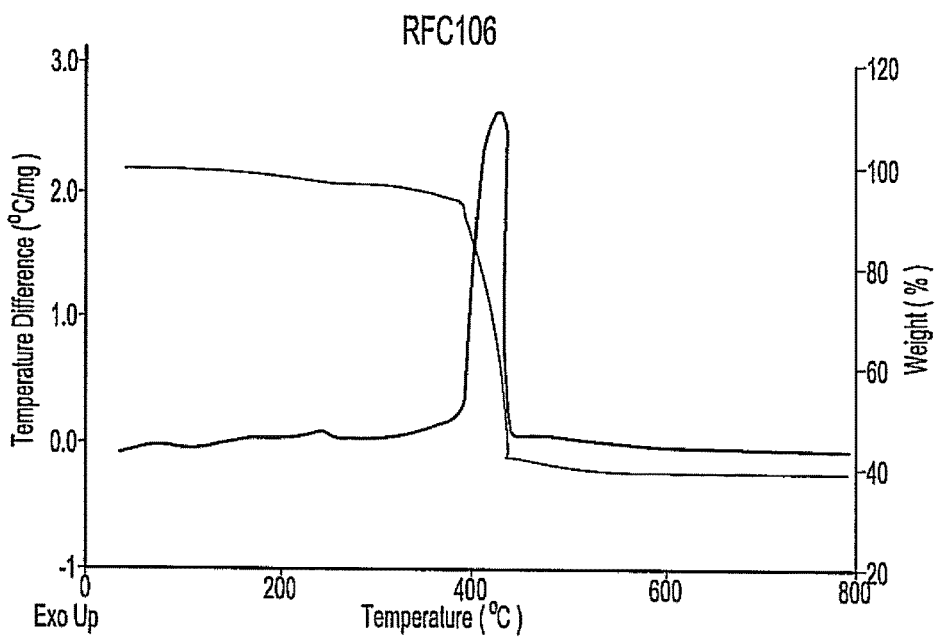
Figure 19D:
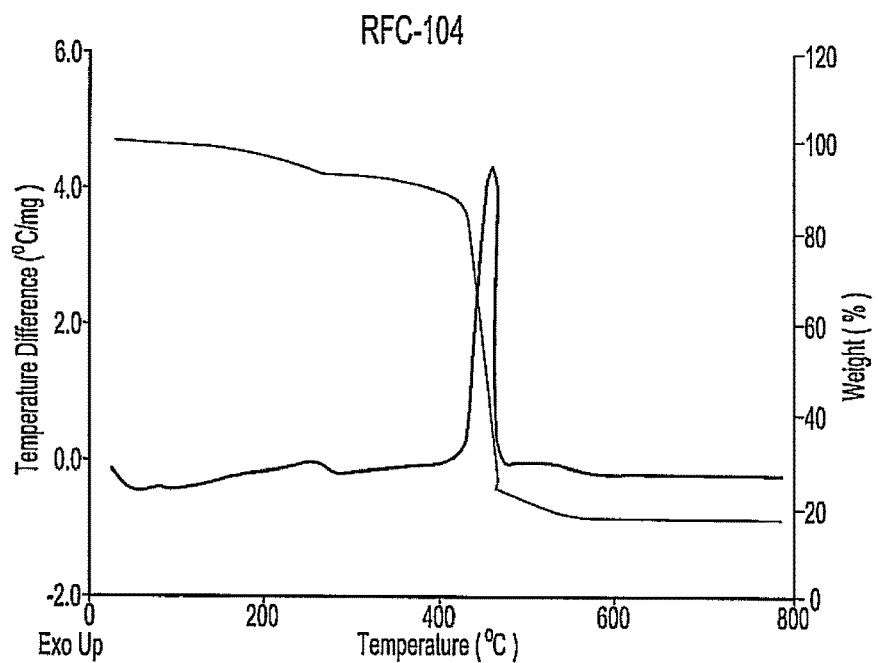
Figure 19E:
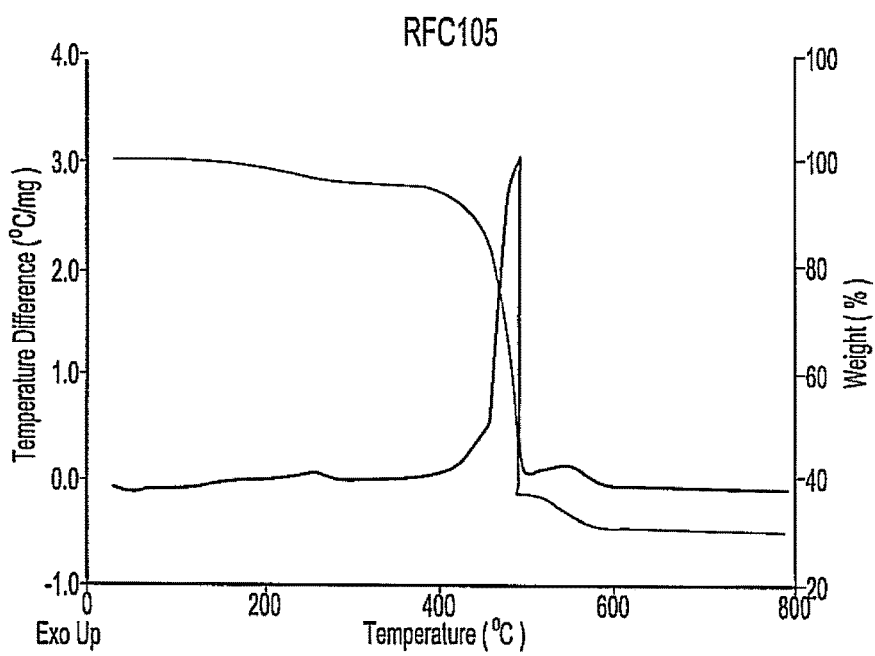

| Electrocatalyst type | Sample name | # of batches prepared for each sample | Target amount of sample prepared (mg) | Total amount of sample prepared (mg) | % yield |
|---|---|---|---|---|---|
| Pt/SnTPPS4/C | DFC91 | 1 | 437 | 397 | 90.9 |
| Pt/SnTPPS4/C | DFC90 | 3 | 437 | 422 | 96.6 |
| Pt/SnTPPS4/C (washed with ethanol) | RFC106 | 3 | 437 | 383 | 87.8 |
| Pt/SnTPPS4/Vu | RFC104 | 3 | 376 | 267 | 71 |
| Pt/SnTPPS4/Vu | RFC105 | 3 | 376 | 220 | 55 | similar result is seen for the samples supported on Vulcan carbon black in FIG. 17A-17B namely: RFC104 and RFC105. The average size of the Pt nanodendrites was determined by manual measurement of 100 randomly selected nanodendrites and the average Pt dendrite sizes of all the electrocatalysts are shown in Table 10. These data show that a decrease in the average size of the Pt nanodendrites was observed when the Pt seed solution amount was increased for the Ketjen carbon black samples.

Sample Preparation Results

The X-ray diffraction pattern of all the electrocatalysts are shown in FIG. 18A-18E with the traces illustrating expected peaks for randomly oriented face-centered cubic Pt crystals. The three peaks are attributed to 111, 200, and 220 reflections, respectively, with the peak broadening consistent with the nanoscale structural features of the electrocatalysts.

DTA/TGA Results

FIGS. 19A-19E show the weight change of the sample and the temperature difference accompanying heat treatment in air for all the electrocatalyst samples. In general all the samples lost between 80-50% weight before reaching 560° C. and retained their final weights shown in Table 10 below during the whole process. The final weight of the electrocatalyst samples were considered to be the platinum loading on the respective carbon black (Ketjen and Vulcan XC-72) with all values less than the targeted platinum loading. Note that the differences between the targeted Pt wt % and the actual Pt wt % was largest for the Vulcan carbon black samples. This may be due to poor loading resulting from the reduced surface area of the Vulcan carbon black. The washing and drying process may also account for other differences between the targeted and actual Pt wt % loading.

TABLE 10

| Sample set | Electrocatalyst Type | Sample name | Pt seed amount (ml) | Status | Target % weight Pt | Actual % weight Pt | Average Pt size (nm) |
|---|---|---|---|---|---|---|---|
| Sample set 1 (Pt size effect) | Pt/SnTPPS4/C | DFC91 | $1^a$ | ○ | 45 | $46.6^b$ | $17.4^b$ |
| | Pt/SnTPPS4/C | DFC90 | $5^a$ | ○ | 45 | $42.5^b$ | $10.2^b$ |
| | Pt/SnTPPS4/C | — | $10^a$ | X | 45 | — | — |
| | Pt/C (washed) | — | $1^a$ | XX | 45 | — | — |
| | Pt/C (washed) | RFC106 | $5^a$ | ○ | 45 | $40^b$ | $11.3^b$ |
| | Pt/C (washed) | — | $10^a$ | X | 45 | — | — |
| Sample set 2 (Pt shape effect) | Pt/SnTPPS4/Vu | RFC104 | $3^a$ | ○ | 20 | $17.5^b$ | $6.7^b$ |
| | | RFC105 | $3^a$ | ○ | 40 | $30^b$ | $13.5^b$ |

$^a$Amounts are based on a total volume of 20 ml
$^b$Actual % weight Pt and average Pt size were determined by SNL using TGA and TEM respectively
○ = Successfully prepared,
X = Preparation unsuccessful,
XX = Not prepared
C = Ketjen carbon black
Pt/C (washed) = SnTPPS4 removed by washing in EtOH after preparing Pt/SnTPPS4/C
Vu = Vulcan XC-72 carbon black Sample Preparation Results The results from the sample preparation are summarized in Table 10. Note that the electrocatalyst samples prepared with 10 ml equivalent Pt seed solution were abandoned due to a failed attempt to load the Pt seed onto the carbon black.

TEM Image Results

Figure 16A:
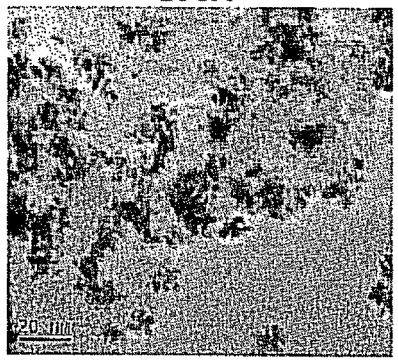
FIGS. 16A-16C show high resolution TEM images of Pt dendrites on Ketjen carbon black for various electrocatalyst samples, namely: (16A) DFC91; (16B) DFC90; and (16C) RFC106.
Figure 16B:
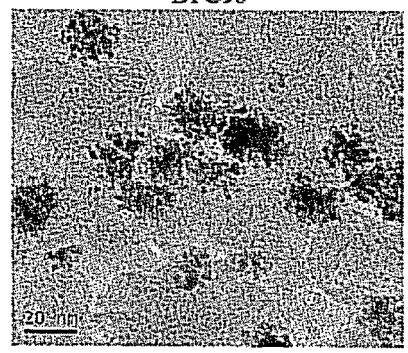
Figure 16C:
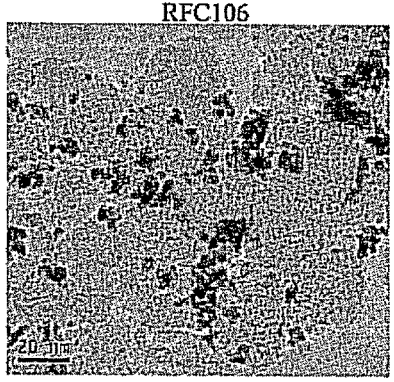

TEM images such as those shown in FIGS. 16A-16C were taken of all the electrocatalyst samples. These images illustrate that the platinum nanodendrites were supported on carbon black due to the high surface area of the Ketjen carbon black namely: DFC91, DFC90 and RFC106. A Other Examples and Alternatives Other preparation examples may include exposing a carbon support, radical anion, and metal precursors without the presence of photocatalysts. Electrocatalysts prepared according to the present invention may be organic-inorganic hybrid materials, or inorganic materials. In the former case, the organic components will not affect electron conductivity, proton passage, or absorption of gas molecules on catalysts, and gas diffusion. The electrocatalysts produced by methods according to the present invention may also include carbon material formed from organic components through pyrolysis.

In other examples, a photocatalyst is not used. For example, the preparation may involve a carbon support material, one or more radical anion, and one or more metal precursors without the use of a photocatalyst. Other reduction initiators, such as other catalysts, may be dispersed over the surface of the support material to seed the growth of metal particles on the surface.

Examples described include electrocatalysts for fuel cells. However, the invention also relates to other apparatus comprising metal particles formed on a support layer. For example, optical, electronic, and photonic devices may be made using analogous methods.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Provisional Patent Application Ser. No. 60/643,283, filed Jan. 12, 2005, is incorporated herein by reference.

Having described our invention, we claim:

1. An electrocatalyst, comprising:
    a support material comprising electron-conducting carbon particles, wherein the carbon particles include an outer surface; and
    platinum-containing particles formed of reduced platinum evenly dispersed on the outer surface of the carbon particles, the platinum-containing particles having a diameter of between 2 nm and 20 nm and wherein the platinum containing particles chemically bond at an interface with the carbon particles and match the shape of the outer surface of the carbon particles.

* * * * *

UNITED STATES PATENT AND TRADEMARK OFFICE
CERTIFICATE OF CORRECTION

Page 1 of 1

PATENT NO. : 10,186,711 B2
APPLICATION NO. : 14/086694
DATED : January 22, 2019
INVENTOR(S) : Tochi Tudor Nwoga et al.

It is certified that error appears in the above-identified patent and that said Letters Patent is hereby corrected as shown below:

In the Specification

In Column 15, Line 12, delete "2SnP⁻+Pt²⁺2SnP+Pt⁰" and insert -- $2SnP^- + Pt^{2+} \rightarrow 2SnP + Pt^0$ --, therefor.

Signed and Sealed this
Thirtieth Day of April, 2019

Andrei Iancu
*Director of the United States Patent and Trademark Office*